United States Patent
Van Goor et al.

(10) Patent No.: US 10,969,127 B2
(45) Date of Patent: Apr. 6, 2021

(54) RESIDENTIAL ENERGY EFFICIENCY RATING SYSTEM

(71) Applicant: Ademco Inc., Golden Valley, MN (US)

(72) Inventors: Nicolaas Van Goor, Edina, MN (US); Pedro Davalos, Plymouth, MN (US); Girija Parthasarathy, Maple Grove, MN (US)

(73) Assignee: Ademco Inc., Golden Valley, MN (US)

( * ) Notice: Subject to any disclaimer, the term of this patent is extended or adjusted under 35 U.S.C. 154(b) by 534 days.

(21) Appl. No.: 15/423,339

(22) Filed: Feb. 2, 2017

(65) Prior Publication Data
US 2018/0051900 A1  Feb. 22, 2018

Related U.S. Application Data

(60) Provisional application No. 62/376,899, filed on Aug. 18, 2016.

(51) Int. Cl.
*F24F 11/30* (2018.01)
*G05B 15/02* (2006.01)
(Continued)

(52) U.S. Cl.
CPC .............. *F24F 11/30* (2018.01); *F24F 11/62* (2018.01); *G05B 15/02* (2013.01); *F24F 11/46* (2018.01);
(Continued)

(58) Field of Classification Search
CPC ........ F24F 11/30; F24F 11/62; F24F 2110/12; F24F 11/65; F24F 11/46; F24F 2110/10; G05B 15/02; G05B 2219/2642
See application file for complete search history.

(56) References Cited

U.S. PATENT DOCUMENTS 6,179,213 B1  1/2001  Gibino et al.
6,993,417 B2  1/2006  Osann, Jr.
(Continued)

FOREIGN PATENT DOCUMENTS

CN  103269899 A  8/2013
CN  104025131 A  9/2014
(Continued)

OTHER PUBLICATIONS

Titus, Elizabeth, Strategies to Increase Residential HVAC Efficiency in the Northeast (Final Report 2006)[hereinafter "Titus Paper"] retrieved from <https://thehill.com/sites/default/files/NEEP_Strategies_to_Increase_HVAC_Efficiency_0.pdf> (Year: 2006).*
(Continued)

*Primary Examiner* — Alexander Satanovsky
*Assistant Examiner* — Mark I Crohn
(74) *Attorney, Agent, or Firm* — Shumaker & Sieffert, P.A.

(57) ABSTRACT

A residential energy efficiency rating system that may incorporate one or more sensors situated at one or more residential properties, an aggregation and sending device connected to the one or more sensors, a central data receiver and processor connected to the aggregation and sending device, a historical device data storage connected to the central data receiver and processor, and a residential energy efficiency rating calculator connected to the historical device data storage.

15 Claims, 42 Drawing Sheets

(51) Int. Cl.
*F24F 11/62* (2018.01)
*F24F 11/46* (2018.01)
*F24F 11/65* (2018.01)
*F24F 110/10* (2018.01)
*F24F 110/12* (2018.01)

(52) U.S. Cl.
CPC .......... *F24F 11/65* (2018.01); *F24F 2110/10* (2018.01); *F24F 2110/12* (2018.01); *G05B 2219/2642* (2013.01)

(56) References Cited

U.S. PATENT DOCUMENTS

| | | | |
|---|---|---|---|
| 7,530,204 | B2 | 5/2009 | Cook et al. |
| 8,768,655 | B2 | 7/2014 | Singh et al. |
| 8,790,451 | B1 | 7/2014 | Narayanamurthy |
| 9,471,082 | B2 | 10/2016 | Sloop et al. |
| 10,139,123 | B2 | 11/2018 | Quam et al. |
| 2010/0125368 | A1 | 5/2010 | Bailey et al. |
| 2011/0144807 | A1* | 6/2011 | Buda .................. F25B 49/005 700/275 |
| 2012/0089475 | A1 | 4/2012 | Adair et al. |
| 2014/0262134 | A1* | 9/2014 | Arensmeier ........ F24D 19/1084 165/11.2 |
| 2014/0278203 | A1* | 9/2014 | Lange .................... G01K 17/20 702/136 |
| 2015/0127174 | A1* | 5/2015 | Quam ...................... F24F 11/63 700/276 |
| 2016/0266594 | A1* | 9/2016 | Kauffman .............. G06Q 50/06 |

FOREIGN PATENT DOCUMENTS

| | | |
|---|---|---|
| CN | 104303125 A | 1/2015 |
| CN | 105210066 A | 12/2015 |
| CN | 105373971 A | 3/2016 |
| CN | 105429147 A | 3/2016 |
| CN | 105849656 A | 8/2016 |

OTHER PUBLICATIONS

First Office Action and Search Report, and translation thereof, from counterpart Chinese Application No. 201710706296.2, dated May 14, 2020, 31 pp.

* cited by examiner

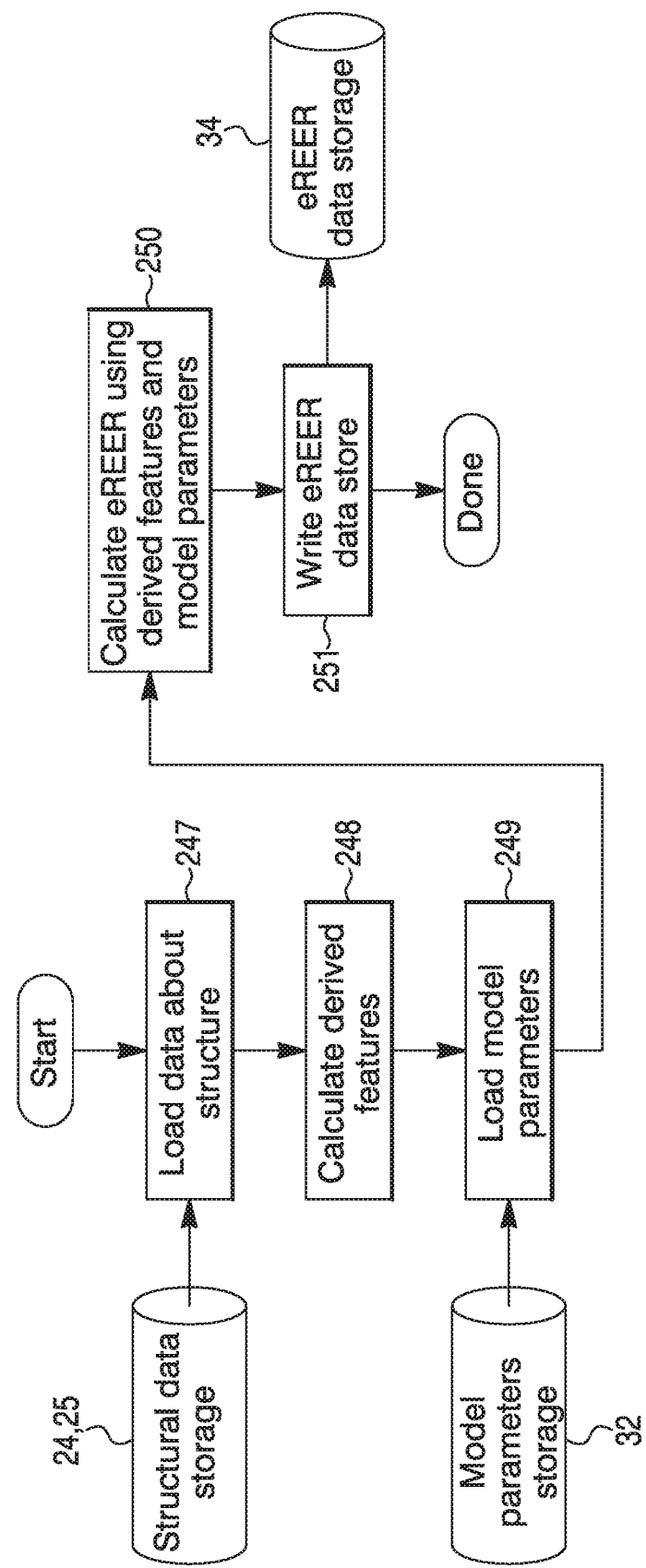

Cycle Off-Times

RESIDENTIAL ENERGY EFFICIENCY RATING SYSTEM

This application claims the benefit of U.S. Provisional Application Ser. No. 62/376,899, filed Aug. 18, 2016. U.S. Provisional Application Ser. No. 62/376,899, filed Aug. 18, 2016, is hereby incorporated by reference.

BACKGROUND

The present disclosure pertains to energy usage of places and particularly to energy efficiencies of such places.

SUMMARY

The disclosure reveals a residential energy efficiency rating system that may incorporate one or more sensors situated at one or more residential properties, an aggregation and sending device connected to the one or more sensors, a central data receiver and processor connected to the aggregation and sending device, a historical device data storage connected to the central data receiver and processor, and a residential energy efficiency rating calculator connected to the historical device data storage.

BRIEF DESCRIPTION OF THE DRAWING

FIG. 2c is a diagram of a flow chart for an eREER calculation explanation;

DESCRIPTION

Figure 1:
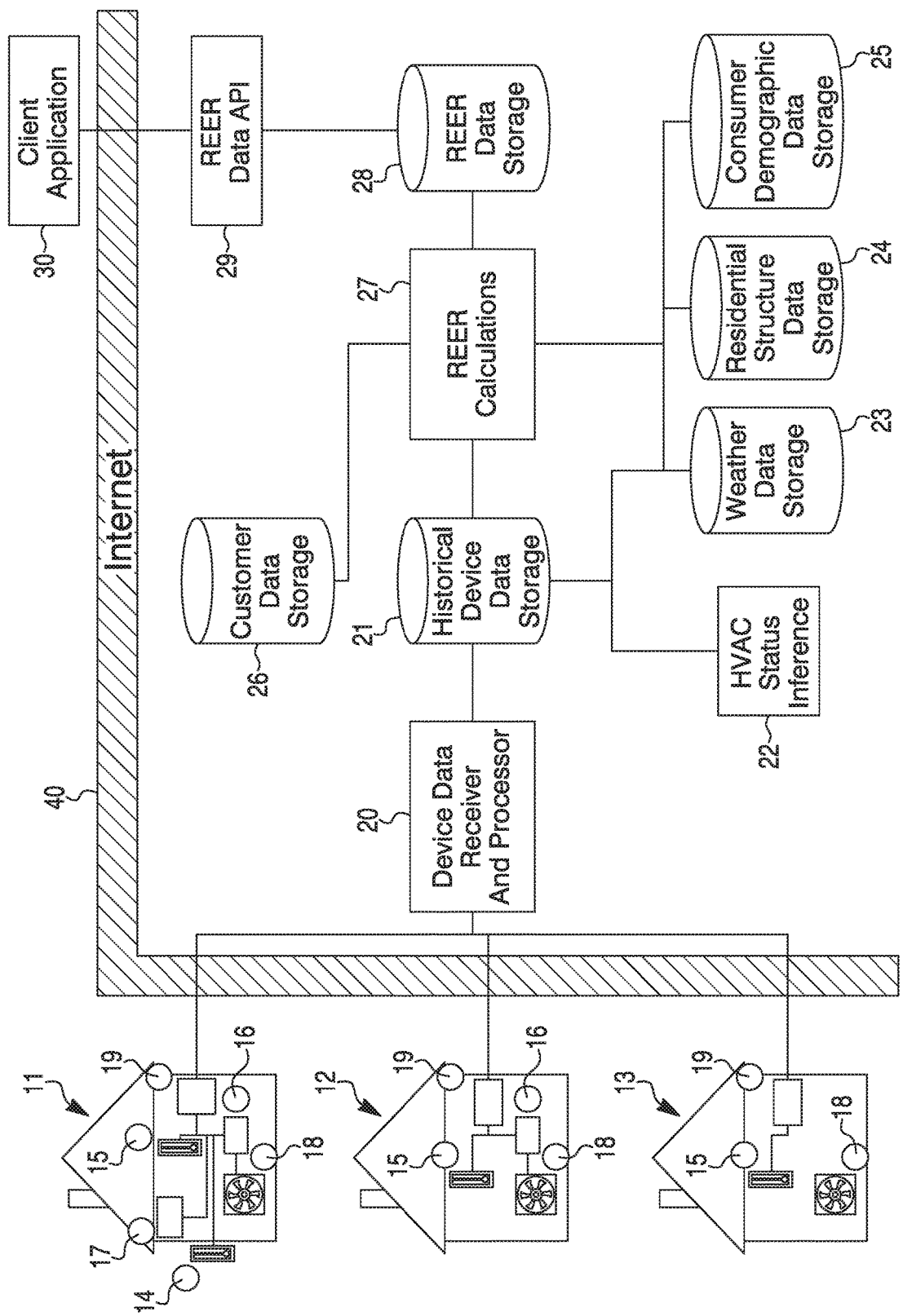
FIG. 1 is a diagram that shows an implementation of the residential energy efficiency rating calculation.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

Understanding the energy efficiency of residential buildings may be of value to many different owners. The stakeholders may include, but may not necessarily be limited to, home owners that benefit from by understanding if and how they might lower their energy consumption; home buyers that benefit by understanding the future operating expenses of a home they may be considering; real estate agents that benefit by more accurately estimating home pricing; home appraisers can benefit by more accurately estimating home values; utilities that benefit because they may be mandated to reduce energy use in their regions and pay directly or subsidize the cost of energy efficiency improvements in homes; and contractors that benefit by understanding that those with homes may be good candidates for energy efficiency projects.

Without home energy audits, it may be difficult to assess the level of energy performance for a house and recommend energy efficiency improvements. Utilities may contract with third party companies to perform home energy audits, and these audits might be paid for or subsidized by the utility, with homeowners paying some of the cost. These audits may be on-site, in person inspections. An issue may be that these in-person inspections may be time-consuming, expensive, and do not necessarily easily scale for large populations, and in a standardized consistent fashion. In addition, homeowners may sign up for these, and many audits do not necessarily result in guaranteed energy improvements, or even guarantee recommendations of cost effective improvements (that is, the home may be very energy efficient, and may not likely benefit from an audit). Interested parties should have a way to target homes with a higher likelihood of implementing cost effective energy efficiency improvements.

The present approaches may develop a virtual energy audit of residences. The approaches for estimating a home energy index may be based from various data sources, including from HVAC data, may provide an automatic, consistent, and continuous approach for performing virtual energy audits. Additionally, statistical procedures disclosed here may allow for an estimation of energy efficiencies of residences for which HVAC data might not be available.

Although conventional in-person energy audits may be comprehensive and can pinpoint exact location of thermal leaks for each house, the present approach may identify the overall energy performance for home heating and cooling (e.g., a building envelope and heating and cooling equipment), which can be generally the largest contributor in terms of energy costs for houses. Therefore, the present approach may enable an identification of houses that would benefit the most from a detailed energy audit, and simultaneously also identify the most efficient houses. Features of this approach for estimating the home energy index may be primarily the passive approach, of leveraging data from a connected home, without the need for any additional sensors, additional measurements. The present approaches may eliminate this constraint by leveraging connect home data, which may include equipment control signals and cycle information about equipment operation.

An approach for calculating an energy index for a house may consist of analyzing thermostat data. Outdoor weather data, real estate property information, and other data may also be used. Specifically, there may be optional approaches as noted in the following.

One approach may involve analyzing individual cycles and focusing on the duration of the off-periods, where a correlation may be made of off-period duration and outdoor weather features such as the temperature difference between the inside and outside, the solar radiation or cloud cover level, and other information like house size and age. The off-period cycle duration, while the set-point and the display temperature remain essentially constant, may be an approximation for the drop in real temperature during this time-period. This approach may assume that a thermostat's installer set-up (ISU) cycle configuration settings remain unchanged during the analysis observation period.

Another approach may be similar in analyzing off-cycle durations, except one might aggregate durations throughout a longer time-period with several cycles, with a constant set-point and temperature, up to a maximum aggregation period.

A further approach may consist of aggregating off-period durations for a longer time-period, with possible changes in set-point, but analyzing data at a daily level.

One may arrive at comparative energy performance indices based on the above off-period parameters. House size, age and other data may be used to further classify and make the home energy index more robust.

Having a calculated residential energy efficiency rating (REER) for a statistically significant number of residences may allow one to estimate the rating for residences for which no connected home data exist. This may be accomplished by identifying inputs, such as structure size, age, and type of construction, to statistical modeling techniques, such as neural networks, regression models, or decision trees, which may be correlated with the rating.

Using a calculated residential energy efficiency rating for a statistically significant number of residences and known information about the residences and its occupants, one may use statistical training techniques to estimate the parameters of the mentioned statistical modeling techniques such that the statistical models most accurately estimate the residential energy efficiency rating for residences for which the residential energy efficiency rating cannot be directly calculated.

Figure 2:
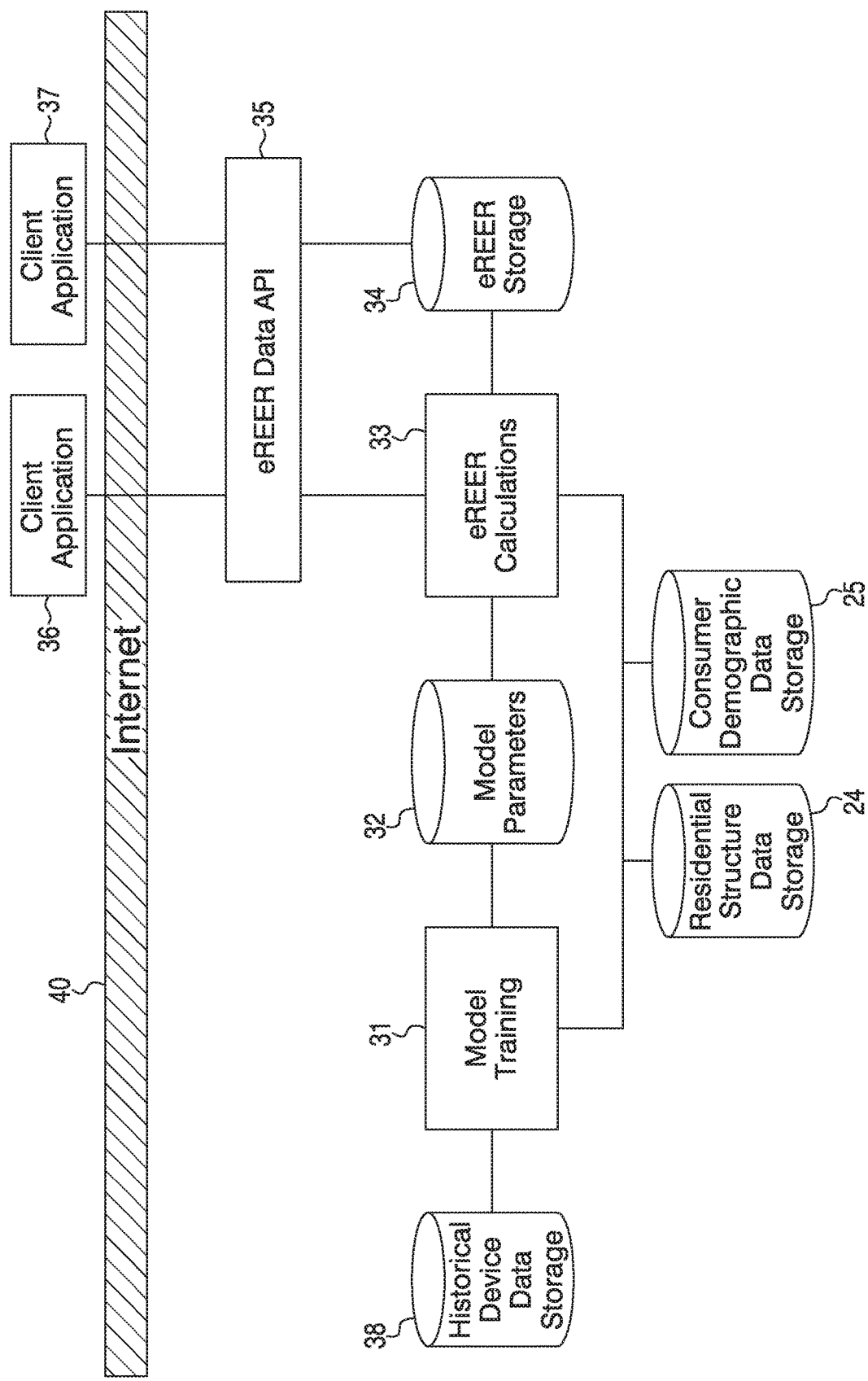
FIG. 2 is a diagram that shows an implementation of an estimated residential energy efficiency rating calculation.

Algorithms described herein may be implemented in a system as depicted in FIGS. 1 and 2. FIG. 1 is a diagram that shows an implementation of the residential energy efficiency rating calculation. In this system, there may be example residential properties 11, 12, and 13 with a variety of sensors. An example residential property 11 may have an outdoor temperature sensor 14, indoor temperature sensor 15, HVAC status sensor 16, set-point sensor 17, HVAC equipment 18, and aggregation and sending device 19. Example residential property 12 may have an indoor temperature sensor 15, HVAC status sensor 16, HVAC equipment 18, and aggregation and sending device 19. Example residential property 13 may have an indoor temperature sensor 15, HVAC equipment 18, and aggregation and sending device 19.

Outdoor temperature sensor 14 may be a sensor placed outside the residence that captures the outdoor temperature. Sensor 14 may be connected wired or wirelessly to a device 19 that sends the collected data over an internet 40 to a central device data receiver 20. There may be none, one or multiples of these sensors.

Indoor temperature sensor 15 may be a sensor placed inside the residence that captures the indoor temperature. Sensor 15 may be connected wired or wirelessly to device 19 that sends the collected data over internet 40 to central device data receiver 20. There may be none, one or multiples of these sensors.

Indoor set-point sensor 17 may be a sensor that knows the temperature set points of a thermostat that may be in the residence. The knowledge may be obtained either by directly sensing the value of the set points or because it may be aware of the history of actuation. Sensor 17 may be connected wired or wirelessly to a device 19 that sends the collected data over internet 40 to a central device data receiver 20. There may be none, one or multiples of these sensors.

HVAC status sensor 16 may be a sensor that knows that status of the HVAC equipment 18. The knowledge may be obtained either by directly sensing the state or because it may be aware of the history of actuation. Sensor 16 may be connected wired or wirelessly to a device 19 that sends the collected data over internet 40 to central device data receiver 20. There may be none, one or multiples of these sensors.

HVAC equipment 18 may be a single or multi stage HVAC system. In certain cases, the state of HVAC equipment 18 may be sent to central device data receiver 20 via sensor 16 and aggregator and sender 19.

Aggregator and sender 19 may have a variety of sensors in and around the residence connected to it either wired or wirelessly. Device 19 may collect data from the mentioned sensors and send it wired or wirelessly across internet 40 to central device data receiver 20. Examples of such devices may include connected thermostats, connected water leak detectors, connected water heaters, and connected home security systems.

A device data receiver 20 may receive the sensor data from the field, execute any necessary decoding and/or parsing and save it in a historical device data storage 21. Historical device data storage 21 may store historical data which can be used as an input to a REER calculation 27.

An HVAC status inference may occur where the HVAC status cannot necessarily be directly observed or recorded. A processor 22 may infer the HVAC status from other data, such as indoor temperature variations. The inferred HVAC status may be stored, when appropriate, in the historical device data storage 21.

Weather data storage 23 may be for weather data that are commonly available. Here, weather data may be used to supplement historical data storage 21 when certain relevant weather related values, such as outdoor temperature, wind speeds, and outdoor humidity, cannot necessarily be directly measured. Weather data storage 23 may forward data to the historical device data storage 21 or may be directly queried when appropriate by a REER calculation 27.

Residential structure data storage 24 may be for certain information about residential structures that may be relevant to calculating the thermal efficiency of the structure. This information may include values like the age, size, and approach of construction of the structure. The residential structure data may be queried directly from REER calculation 27.

Consumer demographic data storage 25 may be for certain demographic information about the residents of the residential structures that may be relevant to calculating the thermal efficiency of the structure. This may include values like the income, age, household composition, and household interests of the residents of the structure. The residential structure data may be queried directly from REER calculation 27.

Customer data storage 26 may be for various and mostly static customer data stored and used by the REER calculation, such as structure location. The customer data may be queried directly for and from REER calculation 27.

REER calculation 27 may involve a processor that exists to calculate the residential energy efficiency rating. The processor may ingest data from data sources such as historical device data storage 21, weather data storage 23, residential structure data storage 24, consumer demographic data storage 25, and customer data storage 26. Additional data from other data sources may also be included. There may be multiple variants of REER calculation, including the following items.

One approach may involve analyzing individual cycles and focusing on the duration of the off-periods, where the correlation of off-period duration and outdoor weather features such as the temperature difference between inside and out, the solar radiation or cloud cover level, and other information like house size and age. An off-period cycle duration, while the set-point and the display temperature remain essentially constant, may be an approximation for the drop in real temperature during this time-period. The approach may assume that the thermostat's installer set-up (ISU) cycle configuration settings remain unchanged during an analysis observation period.

A second approach may be similar to that of analyzing off-cycle durations, except one could aggregate durations throughout a longer time-period with several cycles, with a constant set-point and temperature, up to a maximum aggregation period.

A third approach may consist of aggregating off-period durations for a longer time-period, with possible changes in set-point, but analyzing data at a daily level.

The results of REER calculations 27 may be stored in the REER data storage 28. REER data storage 28 may contain a history of REER calculations stored in the data storage. The data may then be accessed through an application program interface (API) 29 and made available to client applications 30.

REER data API 29 may involve REER data made accessible through an interface that provides proper monitoring and access control to the data. API 29 may be used by client applications 30 for clients' particular purposes.

A variety of client applications 30 may use the REER data for particular purposes. The applications 30 may access the REER data through REER API 29.

FIG. 2 is a diagram that shows an implementation of an estimated residential energy efficiency rating calculation. There may be an energy efficiency rating data storage 38 that contains a history of energy efficiency ratings for a significant number of residential homes. A present efficiency rating may be the REER. There may be a residential structure data storage 24 that contains information about residential homes. This information may contain data such as the homes' ages, sizes, and types of construction. There may be a consumer demographic data storage 25 that contains information about consumers that may reside in the homes. This information may contain data such as the residents' incomes, family compositions, and interests.

The data contained in data storage 38, 24, and/or 25, as well as potential other data sources, may be accessed by a model training processor 31, which uses the data to calculate the statistical model parameters. The statistical model may be a neural network, regression, decision tree, or other statistical models, as appropriate. The model parameters may be stored in the model parameter data storage 32.

Data from parameter and data storage 32, 24, and/or 25, as well as potential other data sources, may be accessed by an estimated residential energy efficiency rating (eREER) calculation processor 33 to calculate the estimated residential energy efficiency rating for any home for which the appropriate data may be available. The calculation may occur on demand or in a batch manner. In either case, the results may be stored in the eREER data storage 34.

The eREER results may be made accessible through an API 35 that can be accessed by client applications 36 and/or 37. In this example, client application 36 may request an on-demand calculation of the eREER for one of more particular properties through API 35. In this case, the eREER may be calculated on-the-fly using the appropriate data. Client application 37, on the other hand, may make a request for eREER results that have been calculated previously and may be stored in eREER storage 34.

Figure 2A:
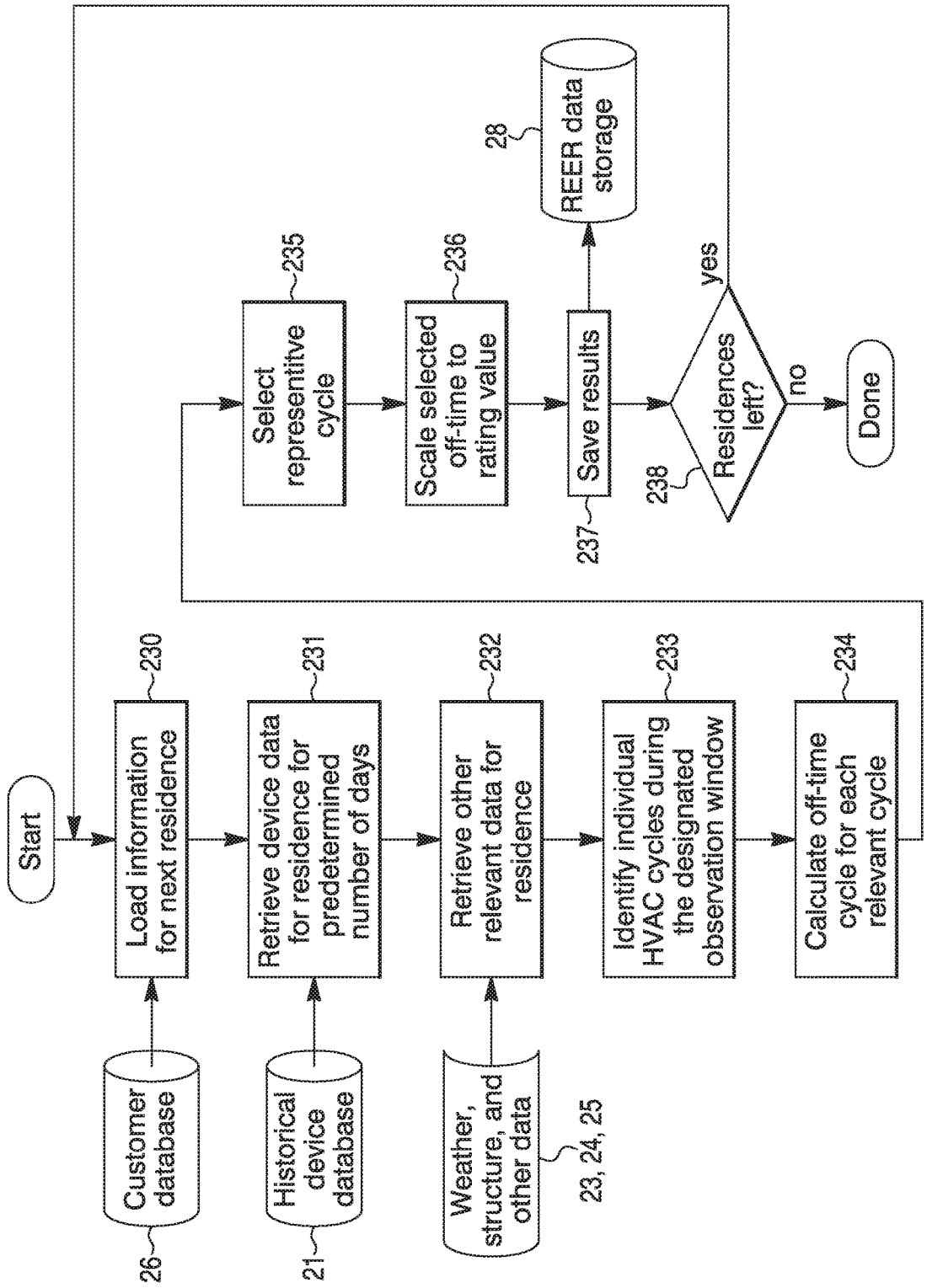
FIG. 2a is a flow diagram of a residential energy efficiency rating calculation.

FIG. 2a is a diagram of a flow chart for a REER calculation. At symbol or step 230, customer information, such as residence location, may be loaded from the customer database 26 for the next residence.

At step 231, historical device data, such as HVAC equipment run-time, may be loaded from the device data storage 21 for the residence. Typically, a number of days, such as seven, of data may be loaded to stabilize the final rating. At step 232, additional data, such as outdoor weather data, may be loaded from data storage 23, 24, and 25. The data range may match the data retrieved in step 231.

At step 233, cycles may be identified in the device data by observing the events that indicate that the HVAC equipment has been turned on. A cycle may be a period between two consecutive events that indicate that the HVAC equipment has been turned on. To minimize external influences, such as solar radiation or activity in the residence, certain periods during the day may be excluded from this analysis. Cycles may also be disregarded if certain temperature ranges are observed, or for other reasons.

At step 234, each cycle may consist of a period when the HVAC equipment is continuously on, followed immediately by a period when the HVAC equipment is continuously off. The off-time cycle features may consist of the time that the HVAC equipment is off and the temperature difference between inside and outside the house.

At step 235, the previous steps may result in a number of off-time cycle features calculated for each residence. To get to a single number, a representative cycle may be selected. Examples may include taking the mean cycle, or the median cycle, or a mathematical modeling approach that can be used to characterize the relationship between off-times and the in/out temperature differences.

At step 236, the calculated off-time model may be scaled to a rating system that is more convenient, such as a star rating. At step 237, all or some of the results may be stored into the REER data storage 28) for later retrieval. At step 338, if not all residences have been processed, continue to the next residence; or otherwise one may stop.

Figure 2B:
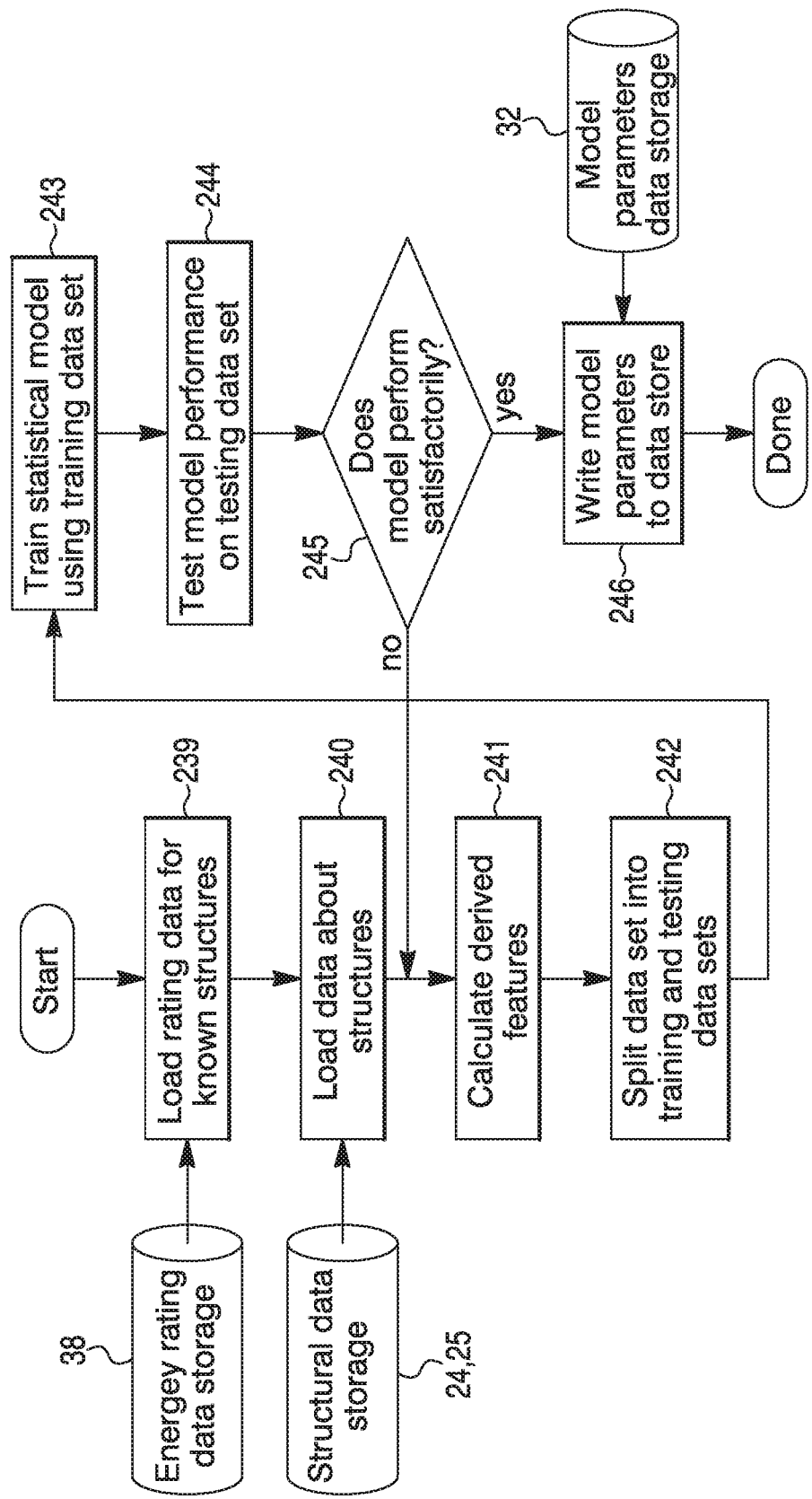
FIG. 2b is a diagram of a flow chart for estimated REER (eREER) model training.

FIG. 2b is a diagram of a flow chart for eREER model training. At symbol or step 239, thermal efficiency rating may be loaded from ratings data store 38. The rating may be the REER or some other rating. At step 240, relevant structure data may be loaded from data storages 24 and 25. These storages may include data about the building, its inhabitants, the environment of the building, and so forth. At step 241, data features that will be used as inputs to the statistical model may be calculated. An example of features that might get calculated may be a structure surface to volume ratio and number of windows per surface area. At step 242, to ensure that the statistical model captures reality, the model parameters may be calculated using a subset of the data (the training data). The model may then be tested against the remainder (i.e., the testing data). This may ensure independent validation of the model. In this step, the data may be split into the two data sets. The splitting criterion may usually be based on a random basis. At step 243, numerous types of statistical approaches might be used to train the eREER model. Examples may include neural networks, regression, and decision trees. In each of the possible approaches, the training data may be used to calculate the model parameters that optimally represent the data. At step 244, the model may be validated using the testing data. As this data is independent from the training data, any bias in the model parameters that might be creating in step 243 should be detected in this step. Various statistical criteria may exist to determine the performance of models. Examples of these may include the coefficient of determination, and the mean square error. At step 245, if the test shows the model parameters to perform unsatisfactorily against the testing data, the process may return to step 241 to review the existing features and create new ones. At step 246, satisfactory model parameters may be saved to the model parameters storage 32.

FIG. 2c is a diagram of a flow chart for an eREER calculation explanation. At symbol or step 247, relevant structure data may be loaded from data storages 24 and 25. These storages may include data about the building, its inhabitants, the environment of the building, and so forth. At step 248, the data features that will be used as inputs to the statistical model may be calculated. An example of features that might get calculated may be a structure surface to volume ratio and the number of windows per surface area. Model parameters may be loaded from data storage 32 at step 249. The eREER may be calculated using the appropriate data features and the previously estimated model parameters, at step 250. At step 251, the calculated eREER value may be saved to the eREER data store 34.

Figure 3:
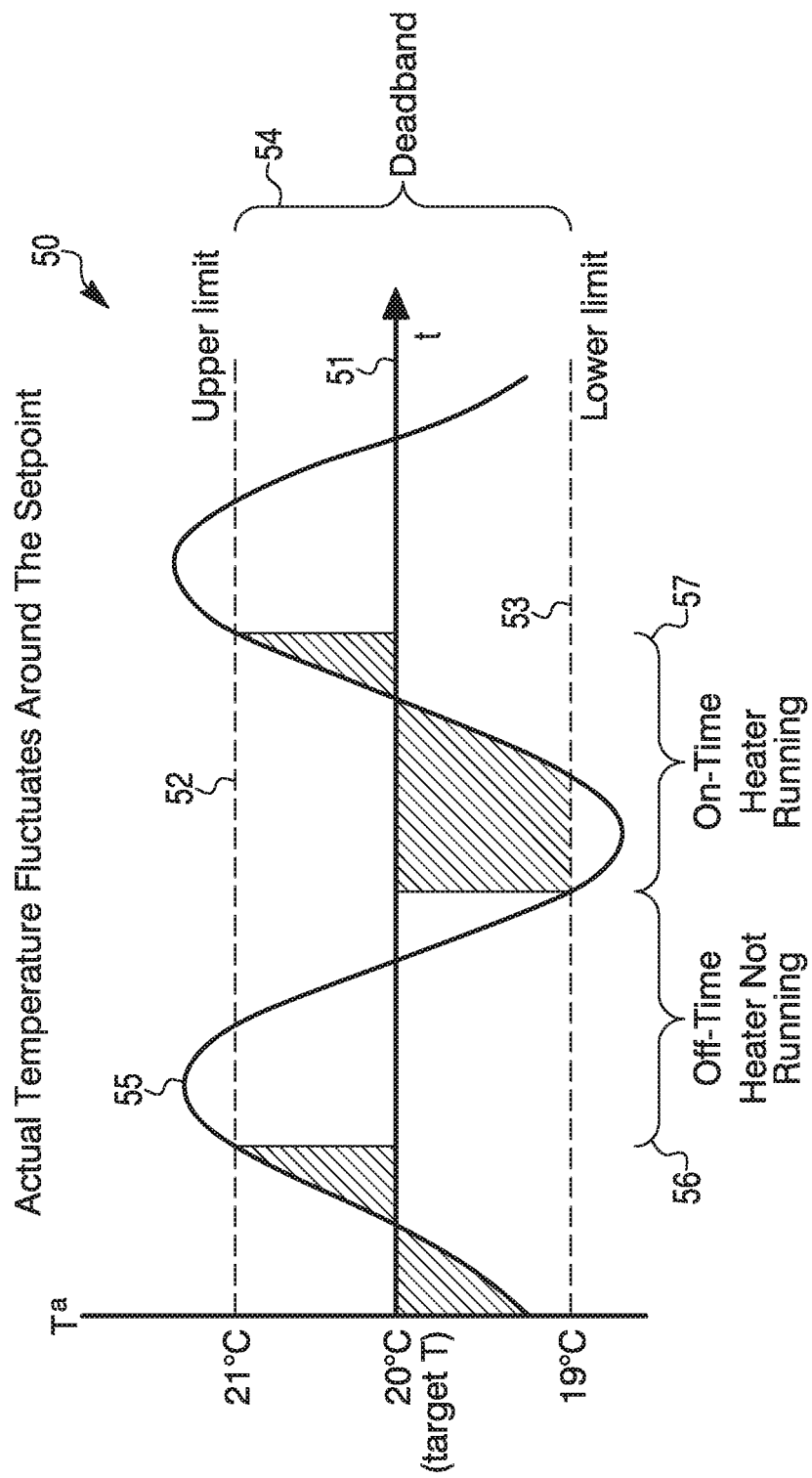
FIG. 3 is a diagram of heating equipment cycles such as during a winter season.

The following discussion may relate to home thermal benchmarking and a virtual energy audit. FIG. 3 is a diagram 50 of HVAC heating equipment cycles such as during a winter season. Theoretically, an actual temperature may fluctuate around a setpoint. A target temperature may be 20 degrees C. as shown by a line 51. An upper limit 52 may be 21 degrees C. and a lower limit 53 may be 19 degrees C. Limits 52 and 53 may define a deadband 54. The temperature may be indicated by a waveform 55. An on-time of the heater is shown by a bracket 56 and off-time of the heater is shown by a bracket 57. The on and off times of the heater may be repeated in a cyclic manner.

Figure 4:
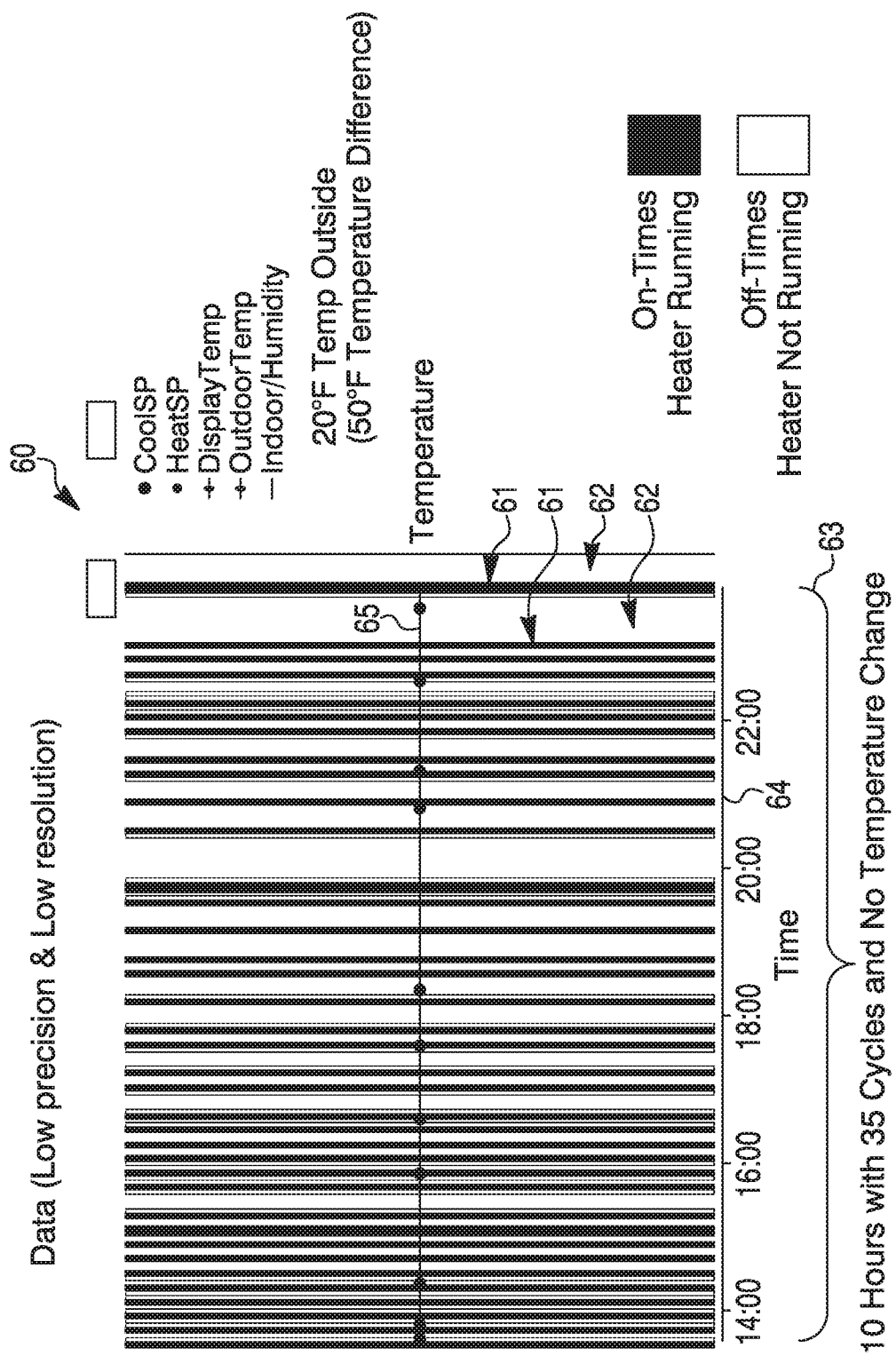
FIG. 4 is a diagram that also relates to heating equipment cycles during a winter season.

FIG. 4 is a diagram 60 also of HVAC heating equipment cycles during a winter season. In practice, the diagram shows on times 61 as indicated by the lines or solid areas, and the off-times 62 of the heater as indicated by the blank spaces. Bracket 63 identifies on the time line 64 of diagram 60 of ten hours with 35 cycles and no temperature change indicated at line 65 relative to temperature line 66.

Figure 5:
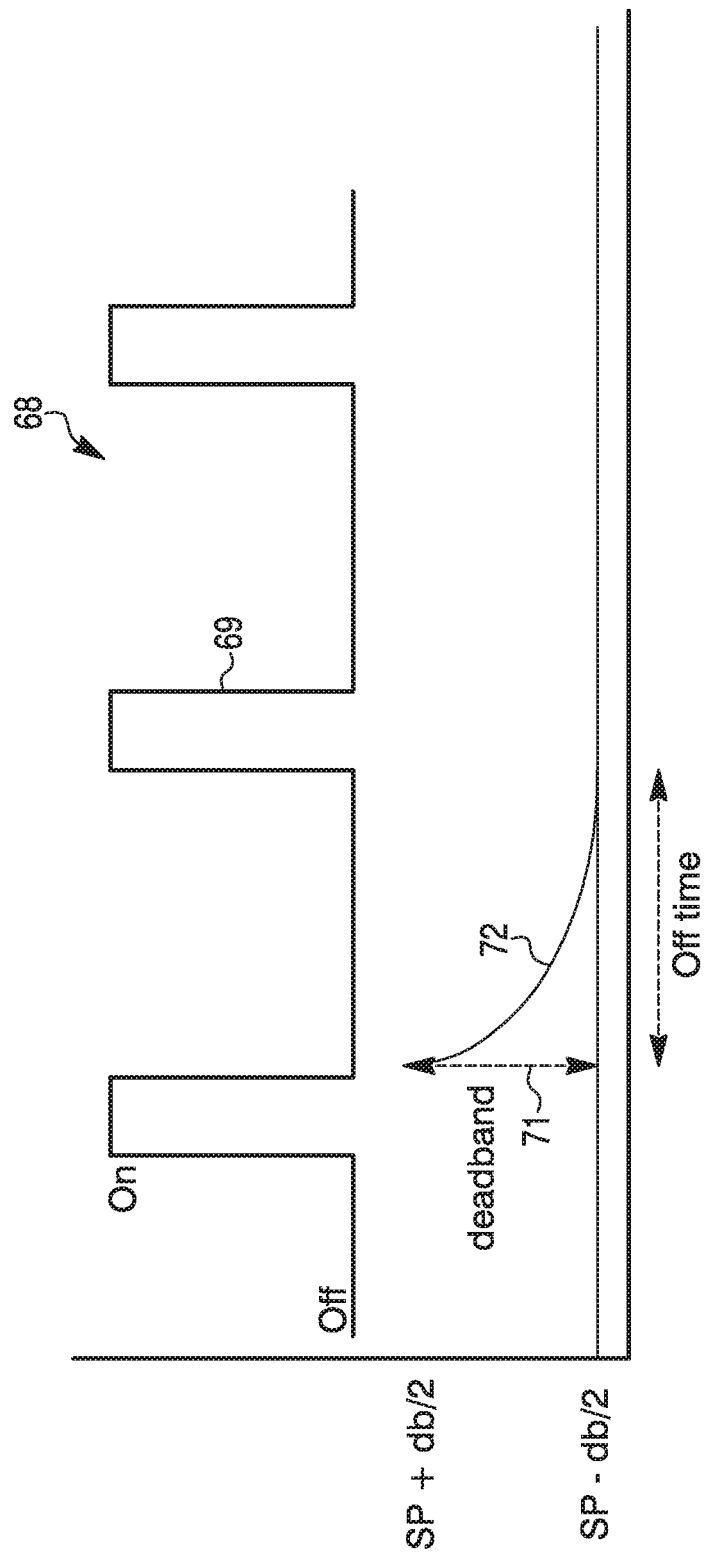
FIG. 5 is a diagram that may indicate an approach for inferring house thermal characteristics.

FIG. 5 is a diagram 68 that may indicate an approach for inferring house thermal characteristics. Curve 69 indicates on and off periods of a heater. Setpoints SP+db/2 and SP−db/2 are indicated to the left of diagram 68 revealing a deadband 71 with a fall of temperature relative to the setpoints as indicated by a curve 72.

In each off period, the indoor temperature may decrease by (deadband) a certain number of degrees F., if the thermostat is actively controlling (e.g., not setback). Off-time for each cycle may be related to (T_in−T_out).

A lumped capacity analysis may reveal:

Deadband/off time=$dT/dt$=$f$(delta$T$)=delta$T$/time constant;

($T\_out$−$T\_in$)/Deadband/off-time)=time constant;

Assuming 1 degree F. deadband (T_out−T_in)*(off time=time constant estimate.

An off-time analysis approach may be noted. Existing data available that are to be leveraged may incorporate user interface data, heat cool demand, and weather. Cycles that can be analyzed (datapoint before, throughout, and after) may be performed with a constant setpoint, constant display temperature, display temperature always at a setpoint throughout a cycle, night-time cycles only (i.e., 7 pm-10 am) to avoid sunlight greenhouse warming effects, cycles in heating mode only, and cycles without gaps in data longer than 2 hours. Cycle off-time analysis as a proxy for rate of temperature drop may be noted.

Additional steps for analysis may be noted. A weather system may be used to process all devices. It may be noted that only about one-third of the devices have outdoor weather saved in their UI data. Metric may be combined regardless of temperature difference (In/Out). This may allow one to compute home insulation efficiency year-round, not necessarily just in the winter. This may also allow one to compare scores between houses. One may compute a metric weekly. Such may allow obtaining an insulation score history per house over time. During the summer cooling, home performance may be evaluated. This may allow one to compute home insulation year-round, not just in the winter.

Assumptions and analysis may be noted. A lumped capacity thermal system may be assumed. In addition to thermal performance, temperature drops (heating season) may be attributed to a surface area of an envelope, thermal capacity of a house (such as how much stuff is in the house and how thermally dense it is), and a thermostat location in the house. The last two indicated influences (wrapped up in overall variability), one may use house data from, for example, InfoGroup™ or other sources of data, to obtain square footage, and a number of floors to get a surface area estimate.

Further analysis may provide (T_out−T_in)*(off time)= time constant estimate R_equivalent=)T_out−T_in)*(off time)*surface area/(thermal capacity). Higher the R_equivalent, the better may be the envelope thermal properties, assuming equal thermal capacity. Other data sources may be sought out to tighten benchmarking.

Real estate data sources may be noted. With InfoGroup™ YLM data, house size and year built may be obtained. Devices may be selected according to criteria such as one thermostat per location, user address matching the location address, off-time efficiency data available from a past time to the present time, a device and user being still registered and online, and InfoGroup™, or other provider demographic data available for the device.

Figure 6:
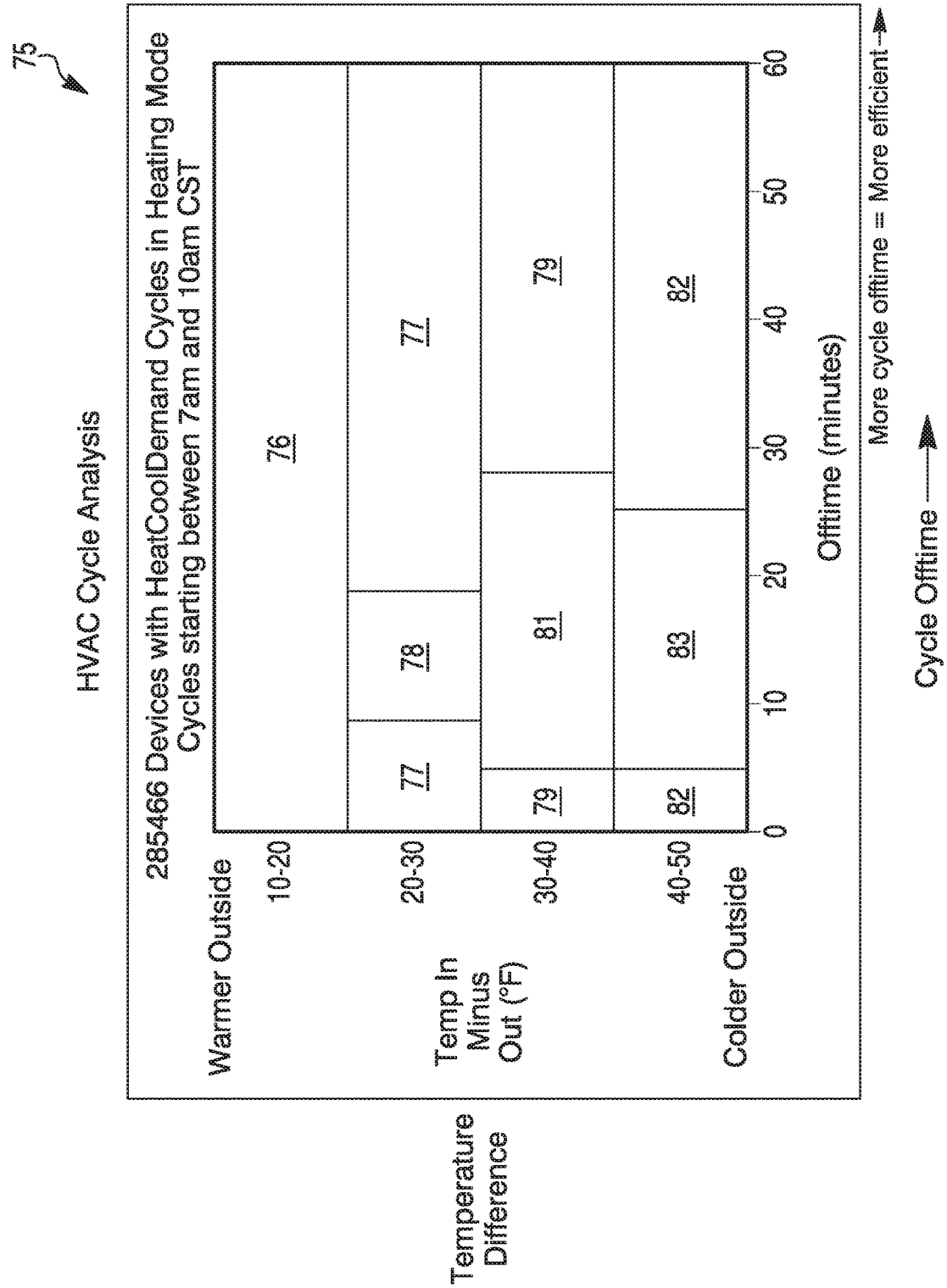
FIG. 6 is a diagram that reflects overall off-time analysis results.

FIG. 6 is a diagram 75 that reflects overall off-time analysis results, in terms of temperature difference in degrees F. between inside and outside versus cycle off-time in terms of minutes. More cycle off time reflects more efficiency of the heating system. Bar 76 reveals virtually all cycle off-time through the whole time line of one hour for outside temperatures, Temperature in minus Temperature out of 10-20 degrees F. For 20-30 degrees F., the bar areas 77 are a cycle off-time bar and area 78 is the cycle on time. For 30-40 degrees F., the cycle off time is greater as indicated by bar areas 79 and cycle on time of bar area 81. For 40-50 degrees colder outside, the off cycle bar area 82 appears greater and area 83 appears slightly smaller relative to corresponding areas for the 30-40 degree range. This may indicate a little more efficient situation for the 40-50 degree range.

Figure 7:
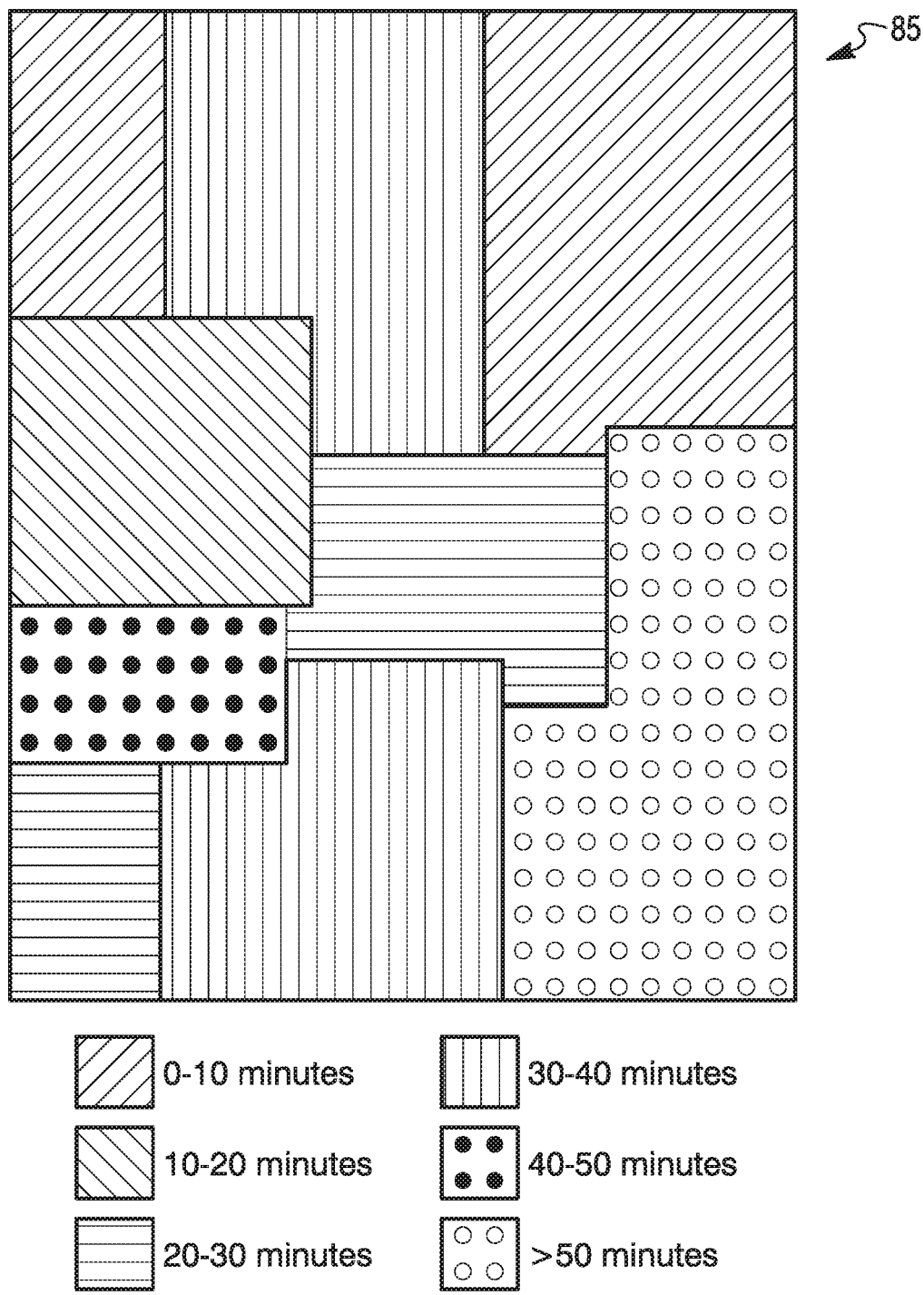
FIG. 7 is an example map of illustrative counties where home thermal efficiencies may be indicated in terms of mean cycle off-times.

FIG. 7 is an example map 85 of illustrative counties where home thermal efficiencies may be indicated in terms of mean cycle off-times with an in/out temperature difference between 30-40 degrees F. over a period of several days.

Figure 8:
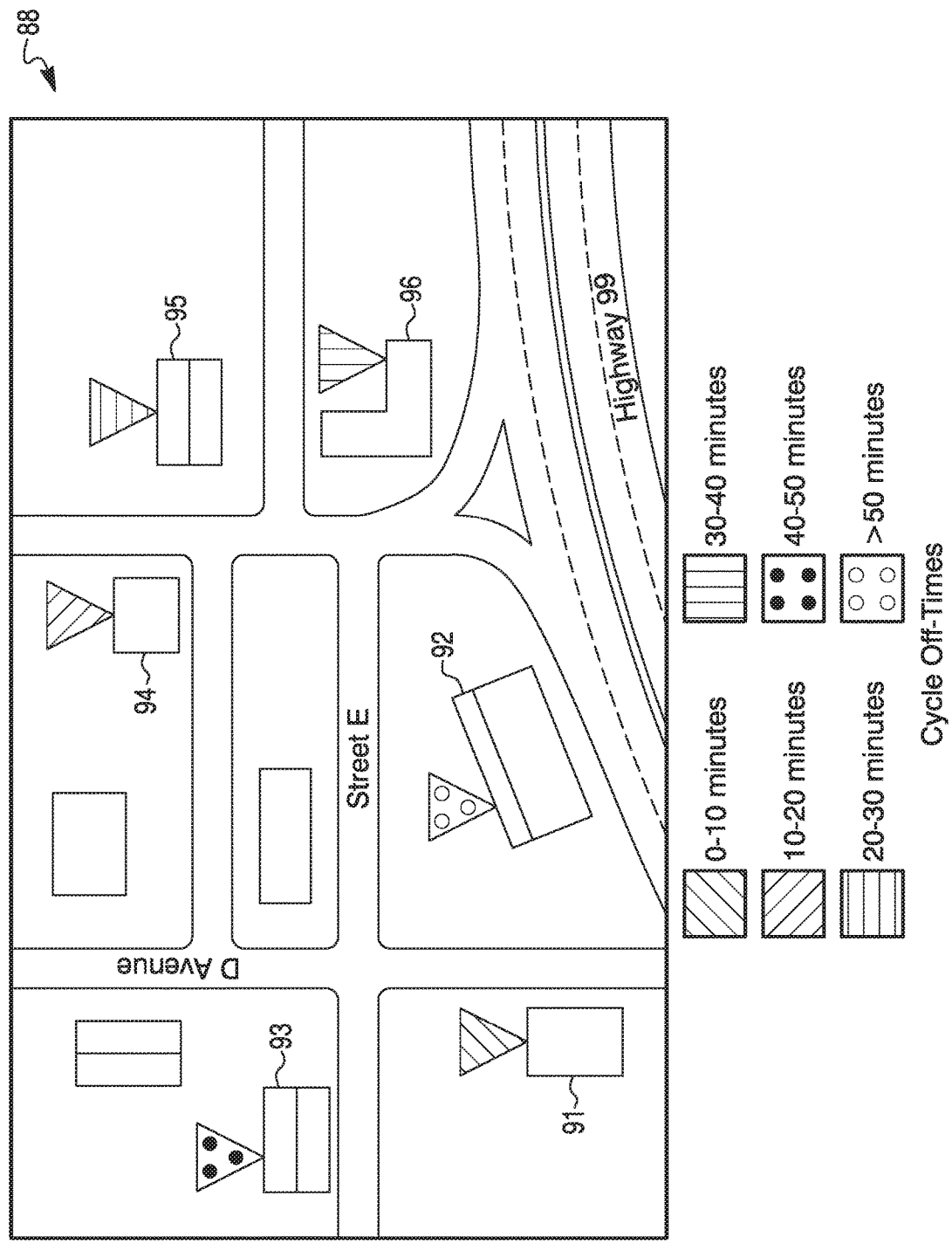
FIG. 8 is a diagram of a map with cycle off-time for various homes and buildings in a residential area.

FIG. 8 is a diagram of a map 88 with cycle off-time for various homes and buildings in a residential area. A cycle off-time for a single family house 91 is indicated on map 88 to be 0-10 minutes. This may be regarded as a low score and having an inefficient situation. A cycle off-time for a condo complex 92 is indicated on the map to be greater than 50 minutes. A single family house 93 is indicated to have a cycle off-time of 40-50 minutes, which may be regarded as an efficient situation. A single family house 94 is indicated to have a cycle off-time of 10-20 minutes which may be regarded as a rather inefficient situation. A single family house 95 and a condo complex 96 are indicated to have cycle off-times of 20-30 minutes and 30-40 minutes, respectively, which may be regarded as fair or mediocre in terms of efficiency situations. Square footage of finished space and build dates of the single family house or the condo may be information provided along with the cycle off-times for structures 91-96 on map 88.

Figure 9:
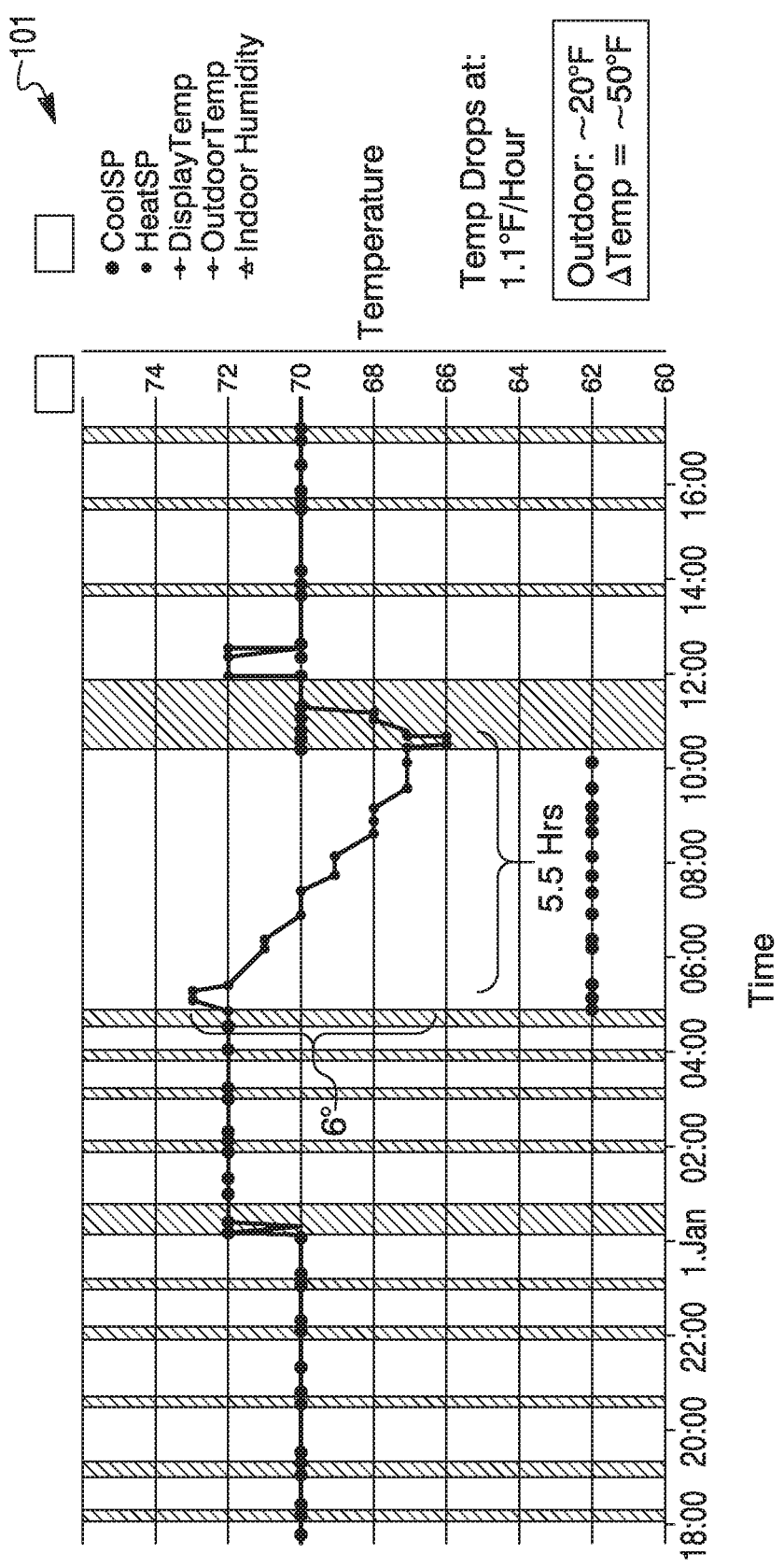
FIGS. 9-12 are diagrams of graphs revealing temperature versus time for various heater off-times.

FIG. 9 is a diagram of a graph 101 revealing temperature versus time. A heater off-time is 5.5 hours with a 6 degree F. drop. This may be regarded as an efficient situation at a 1.1 degree F. drop per hour. This data may reflect that of a condo built in 2006. The outdoor temperature may be about 20 degrees F. and the delta temperature may be about 50 degrees F. This differential may be applicable to subsequent similar graphs.

Figure 10:
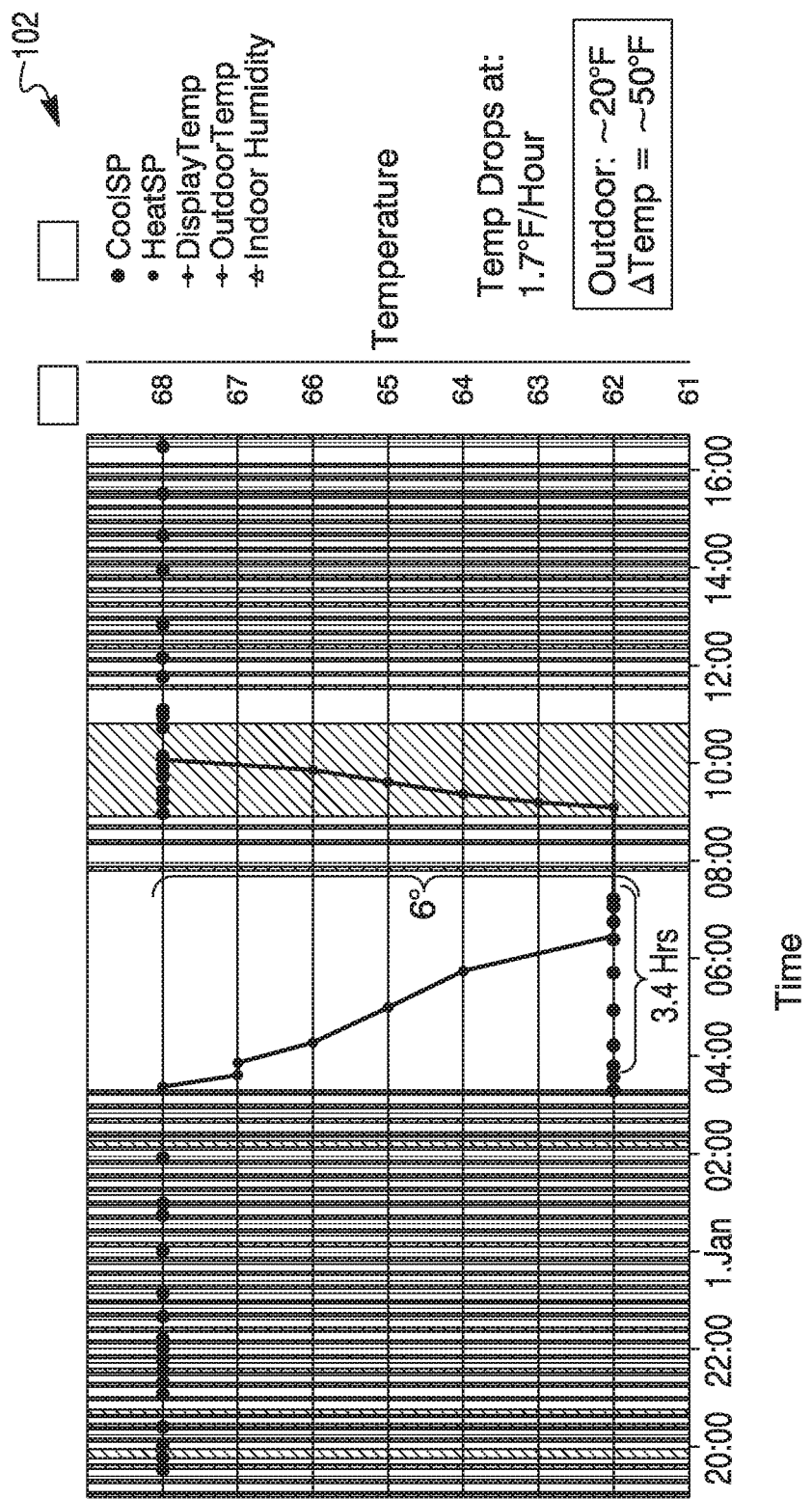

FIG. 10 is a diagram if a graph 102 showing temperature versus time. A 6 degree drop during 3.4 hours may be regarded as an inefficient situation at 1.7 degree per hour. This data may reflect that of a 1,137 square foot house built in 1977.

Figure 11:
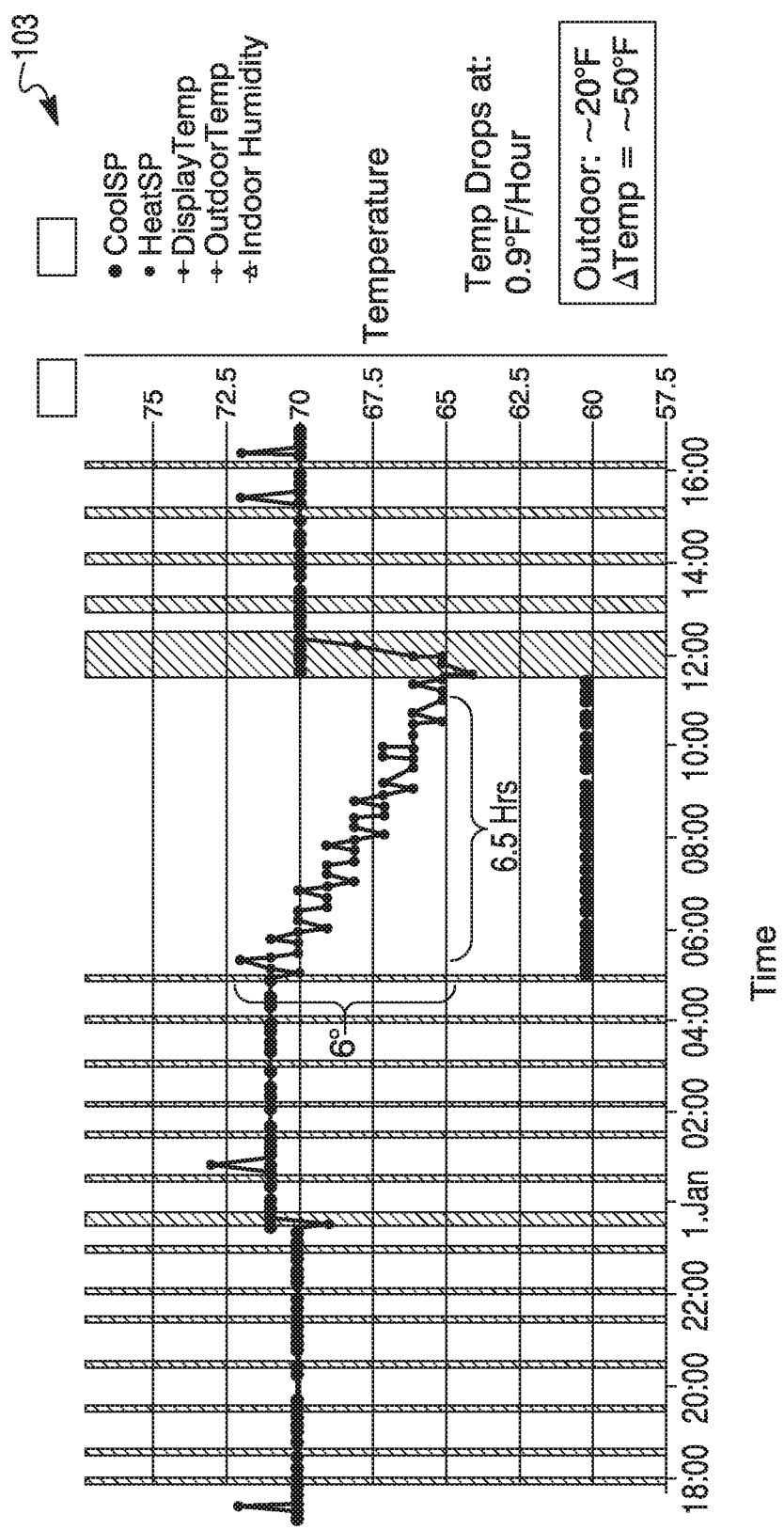

FIG. 11 is a diagram of a graph 103 showing temperature versus time. A 6 degree drop over 6.5 hours of off-time may be regarded as an efficient situation out 0.9 degree per hour. This data may reflect that of a 2,550 square foot single family house built in 1986.

Figure 12:
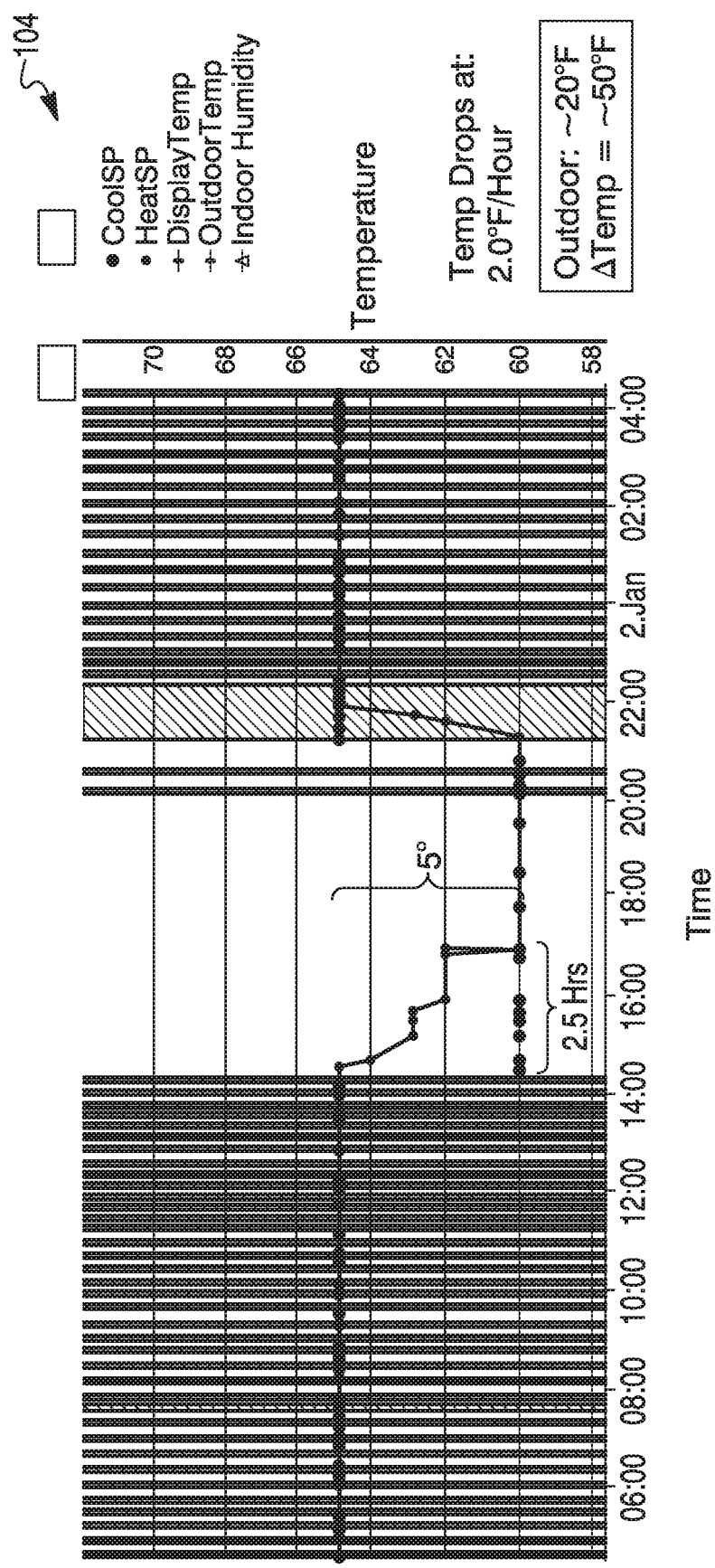

FIG. 12 is a diagram of a graph 104 showing temperature versus time. A five degree drop over 2.5 hours of off-time may be regarded as an inefficient situation of a 2,060 square foot single family house built in 1951 at 2.0 degrees F. drop per hour.

Figure 13:
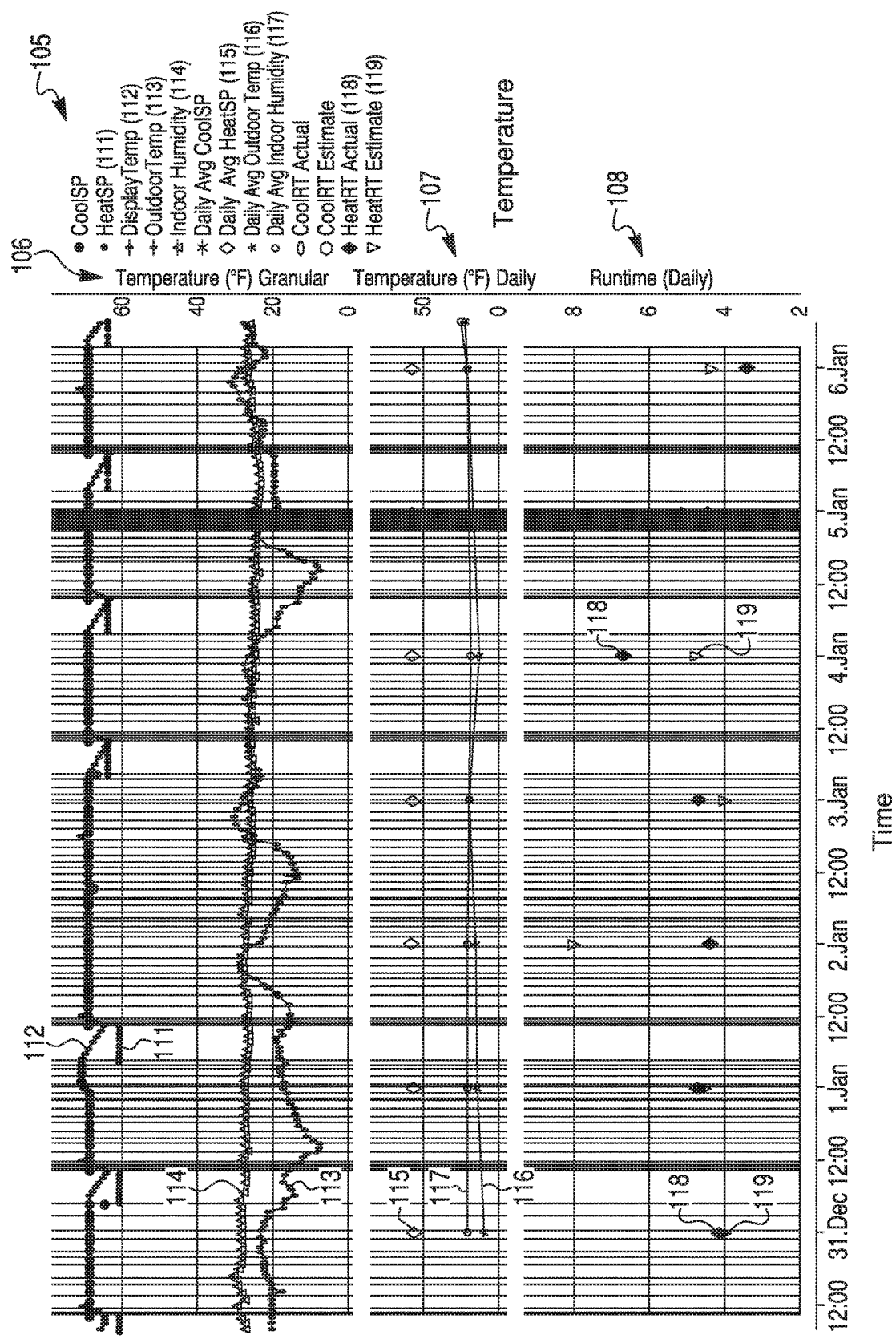
FIGS. 13-14 are diagrams of graphs of time versus granular temperature, daily temperature and daily runtime temperature, relating to efficiency of places.

FIG. 13 is a diagram of a graph 105 of time versus granular temperature 106, daily temperature 107 and daily runtime temperature 108. This data may relate to a 2006 condo with an efficient situation. Symbols 111, 112, 113, 114, 115, 116, 117, 118 and 119 may represent heat SP, display temp, outdoor temp, indoor humidity, daily average heat SP, daily avg outdoor temp, daily avg indoor humidity, heat RT actual and heat RT estimate, respectively. The data of graph 105 may be related to condos built in 2006, having an efficient situation.

Figure 14:
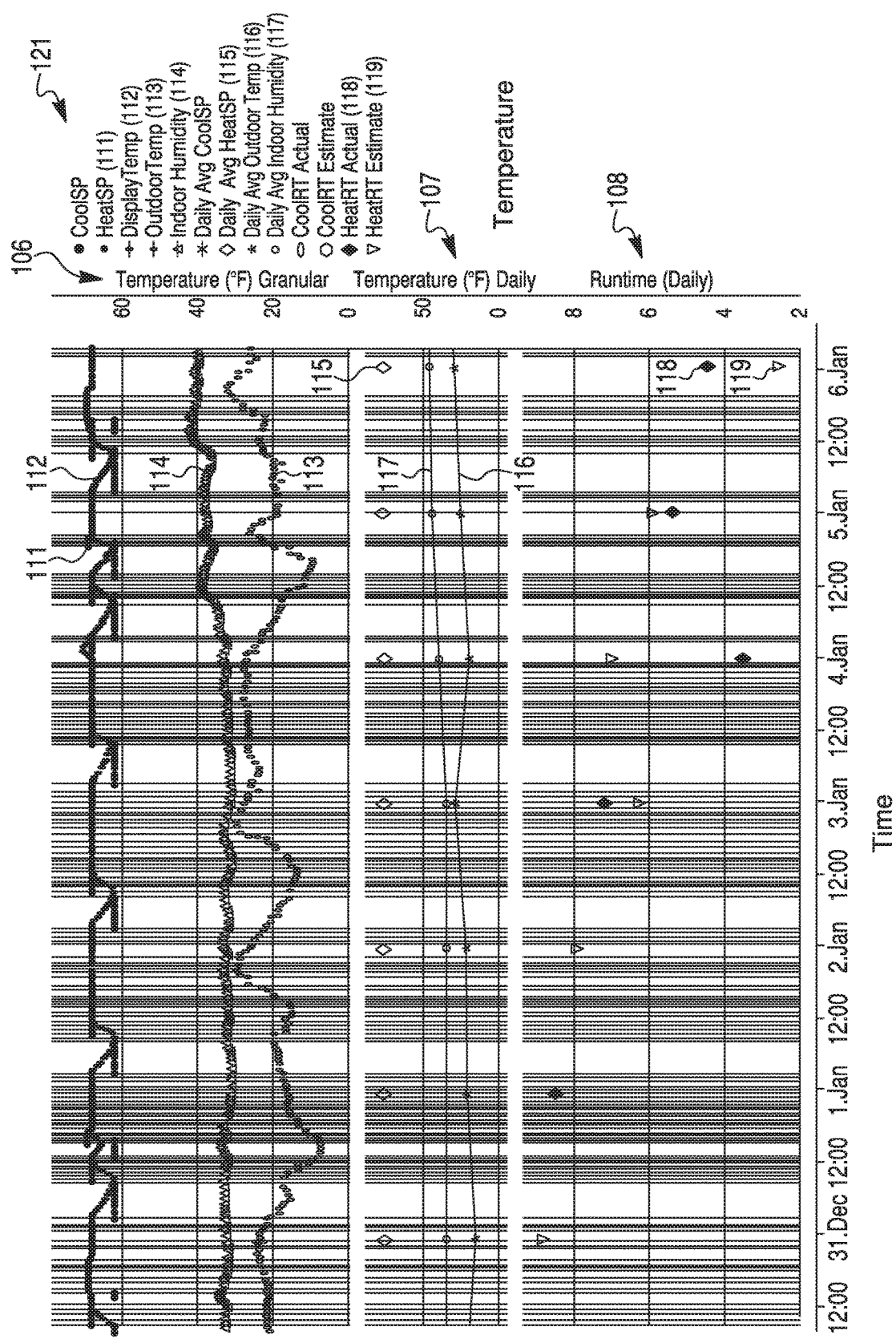

FIG. 14 is a diagram of a graph 121 of time versus granular temperature 106, daily temperature 107 and daily runtime temperature 108. Symbols 111-119 represent the same items as those in FIG. 13. The data of graph 121 may be related to a 1,137 square foot single family house built in 1977, having an inefficient situation.

Figure 15:
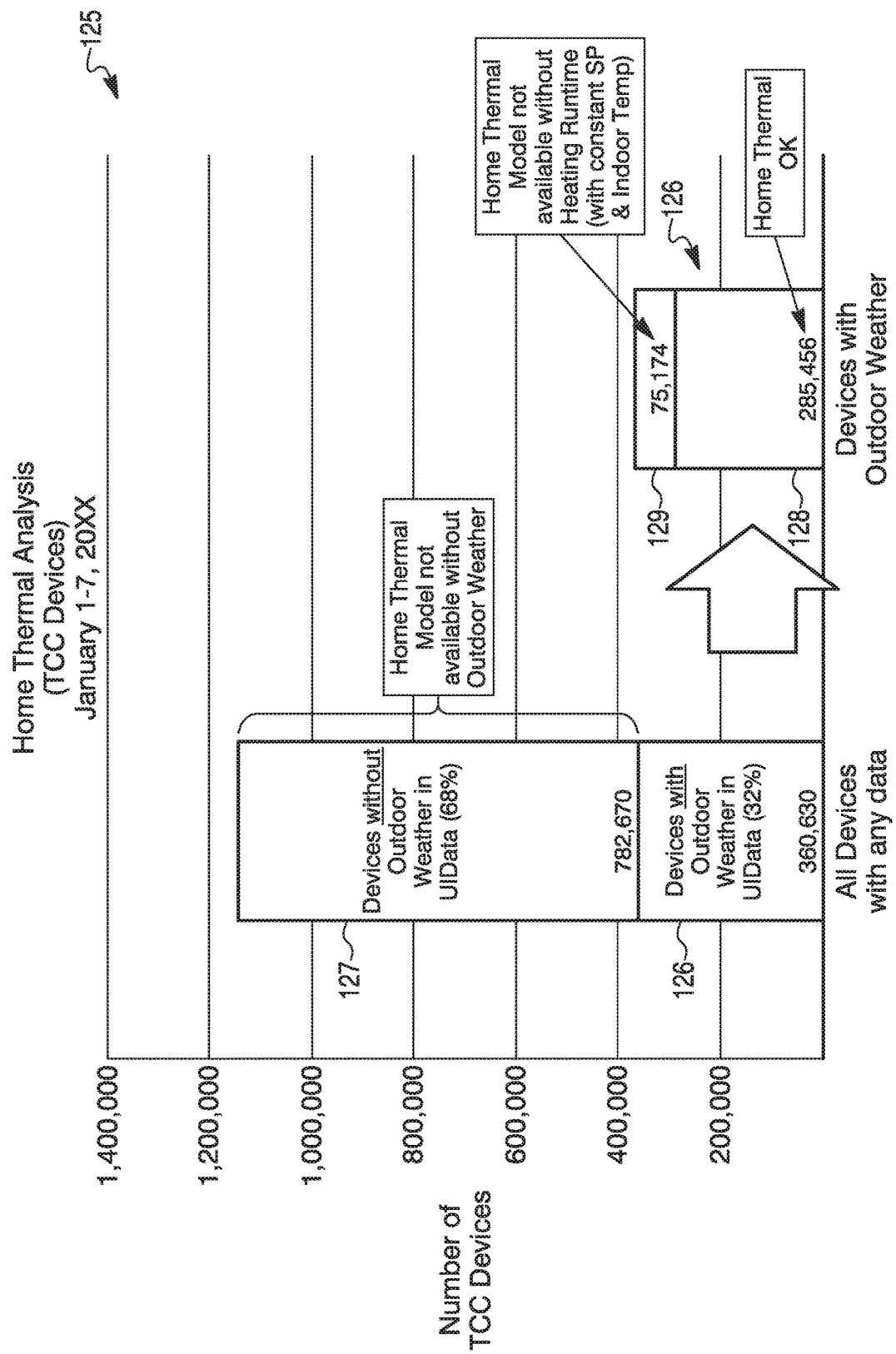
FIG. 15 is a diagram of a graph of devices used in a home thermal analysis during a first week of a year.

FIG. 15 is a diagram of a graph 125 of devices used in a home thermal analysis during a first week in January. Graph 125 may show all devices with any data in bars 126 and 127. Bar 126 may represent 360,630 devices with outdoor weather in UI data, and bar 127 may represent 782,670 devices without outdoor weather in UI data. A home thermal model is not necessarily available without outdoor weather. Bar 126 may be broken down to sub-bar 128 with 185,456 devices that are acceptable for the home thermal model, and to sub-bar 129 with 75,174 devices. The latter device as to the home thermal model are not necessarily available without heating runtime (with a constant SP and indoor temperature).

Figure 16:
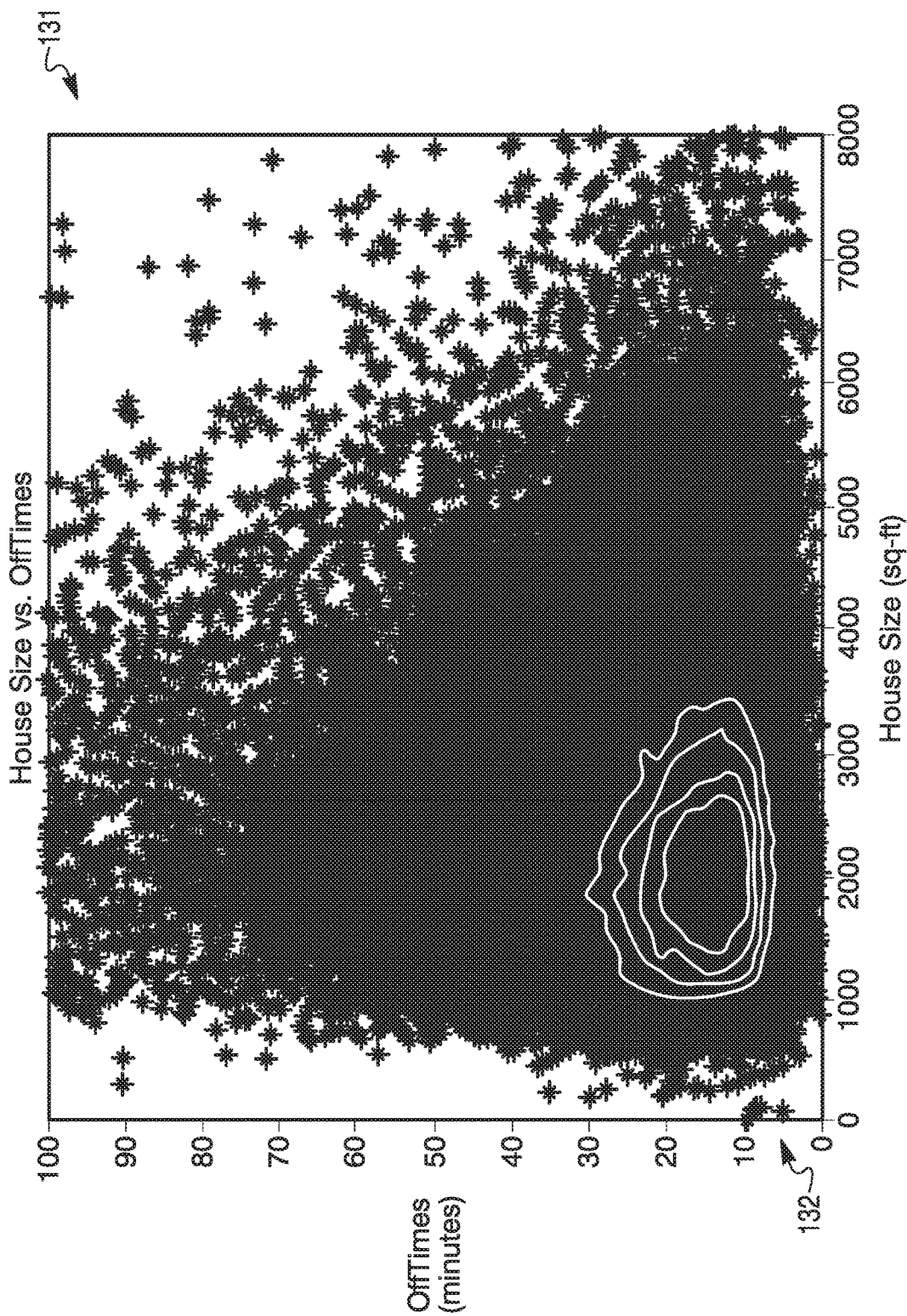
FIG. 16 is a diagram of a scatter plot of house size versus off-time.

FIG. 16 is a diagram of a scatter plot of house size versus off-time in terms of square feet and minutes, respectively. Several contours 132 may be situated at 10 to 20 minutes and 1,000 to 2,000 square feet.

Figure 17:
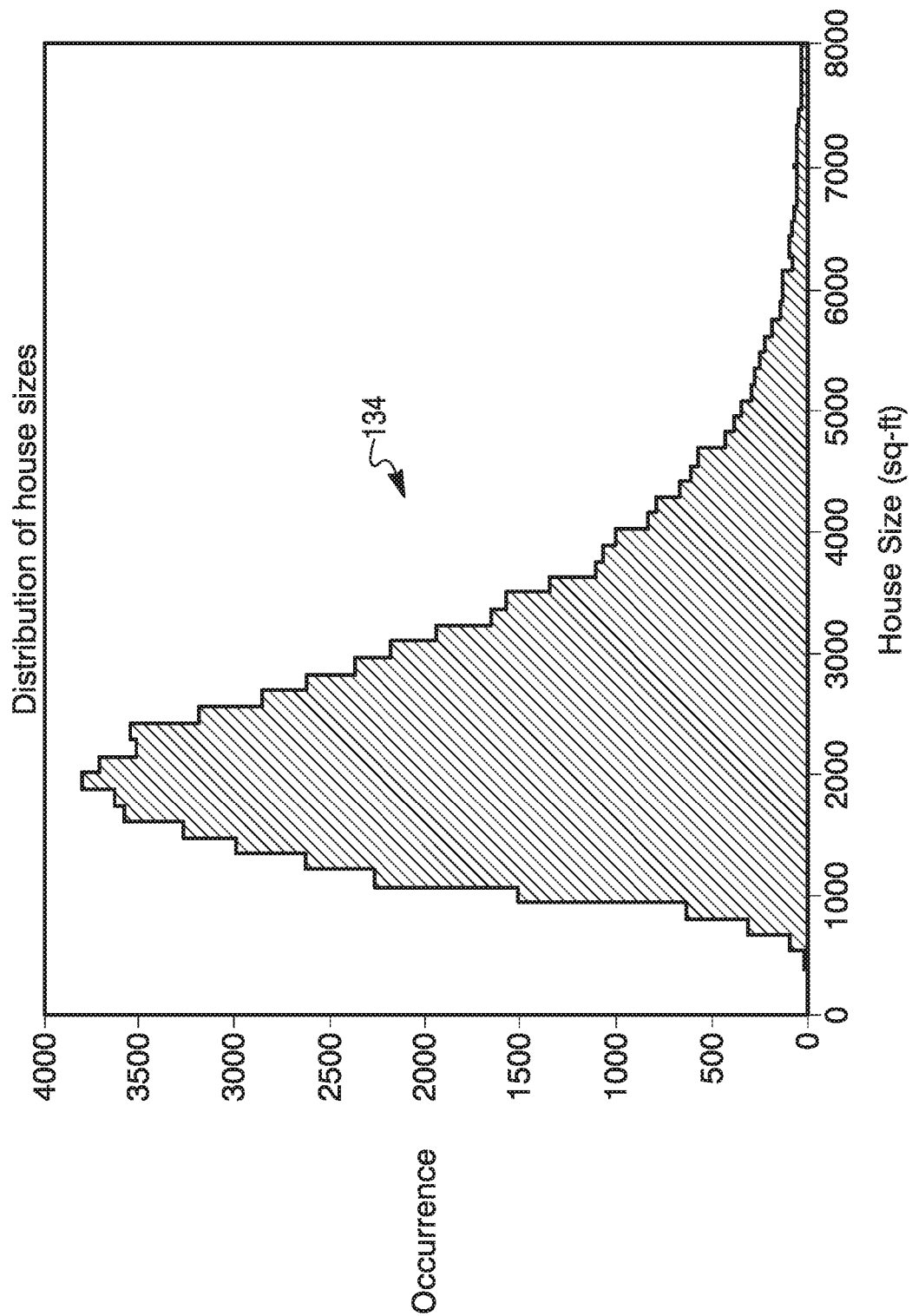
FIG. 17 is a diagram of a graph revealing a distribution of house sizes in terms of a number of occurrences versus house size.

FIG. 17 is a diagram of a graph 134 revealing a distribution of house sizes in terms of a number of occurrences versus house size in square feet. Graph 134 may have a correspondence to graph 131 of FIG. 16.

Figure 18:
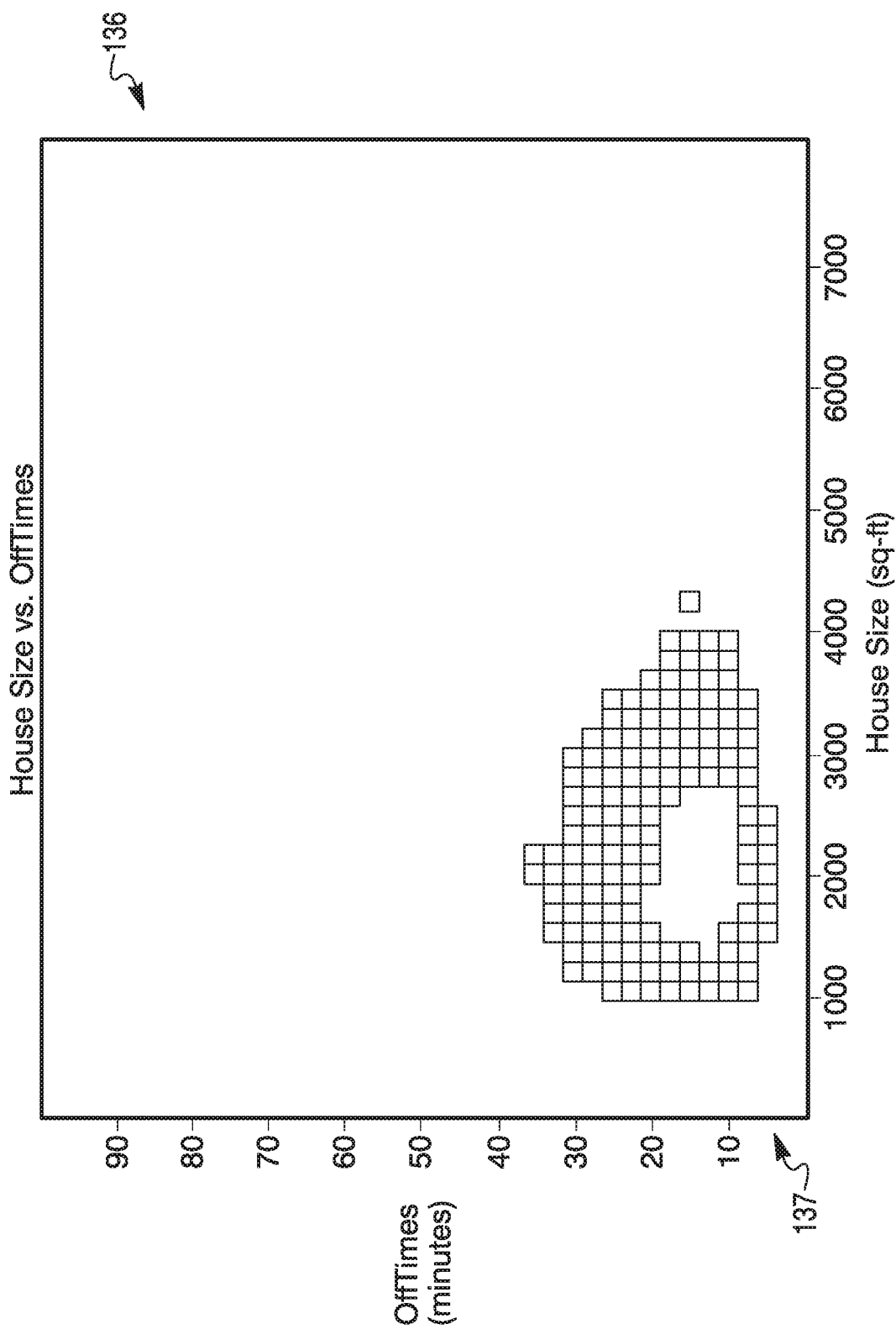
FIG. 18 is a diagram of a two-dimensional density plot in terms of off-times versus house size.

FIG. 18 is a diagram of a 2D density plot 136 in terms of off-times in minutes versus house size in square feet. A density of plot 137 may be situated at 5 to 30 minutes and 1,000 to 3,500 square feet.

Figure 19:
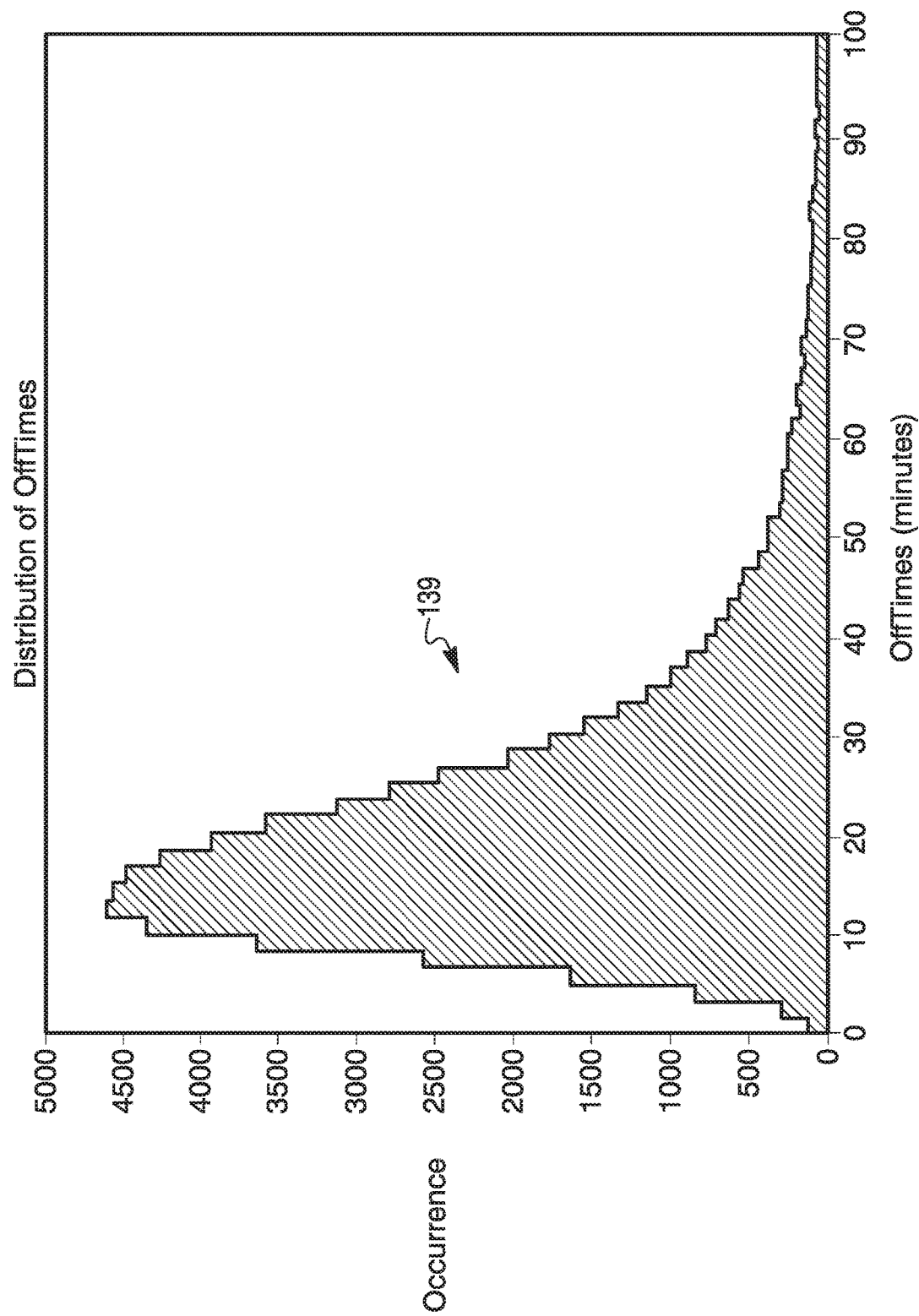
FIG. 19 is a diagram of a graph revealing a distribution of off-times in terms of a number of occurrences versus off-times.

FIG. 19 is a diagram of a graph 139 revealing a distribution of off-times in terms of a number of occurrences versus off-times in terms of minutes. Graph 139 may have a correspondence to plot 136 of FIG. 18.

Figure 20:
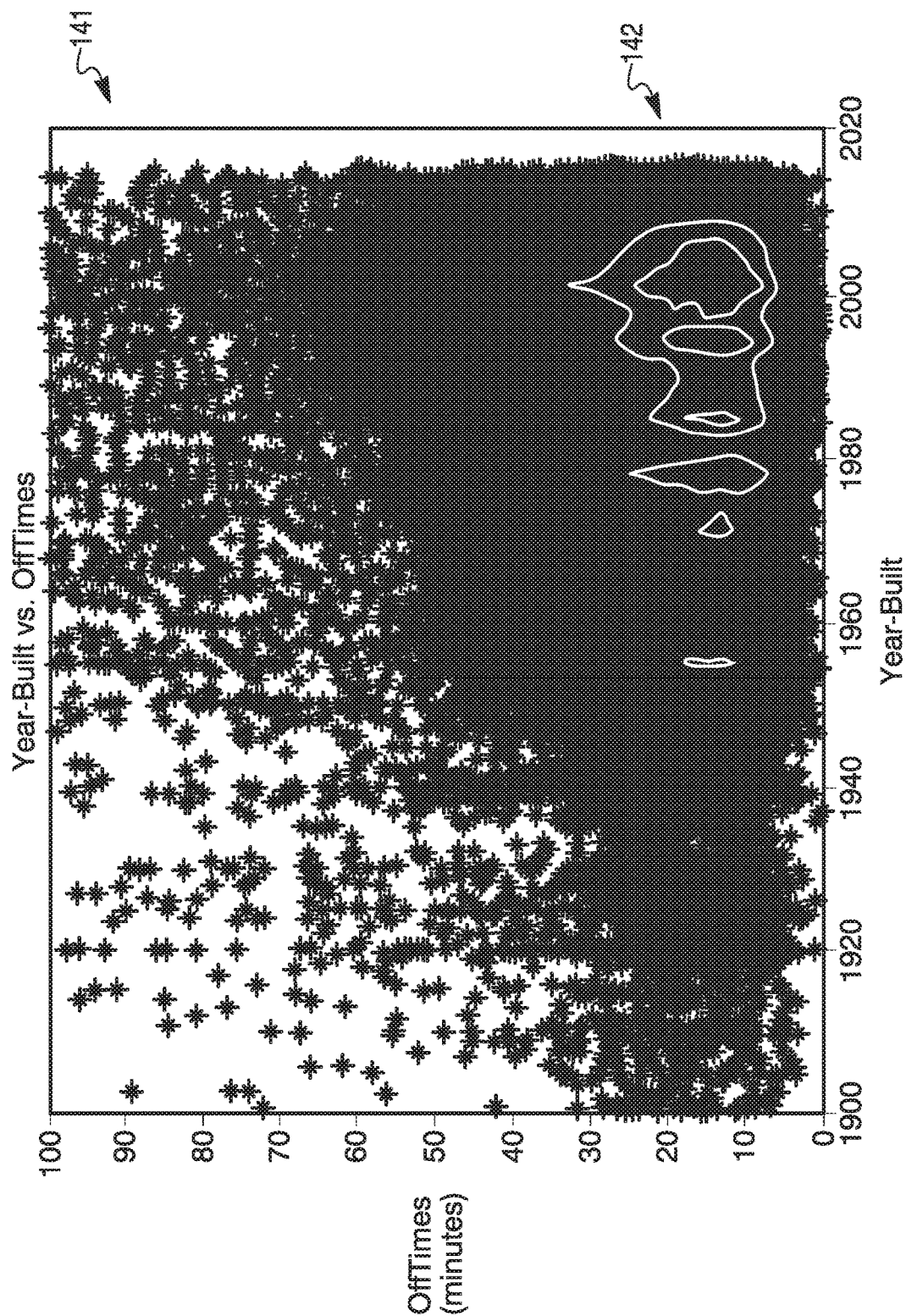
FIG. 20 is a diagram of a scatter plot with contours in terms of off-times versus the year-built.

FIG. 20 is a diagram of a scatter plot 141 with contours 142. The plot appears as off-times in minutes versus the year-built. Contours 142 cover an area situated between about years built 1955 and 2010 and of off-times from about 5 to 30 minutes.

Figure 21:
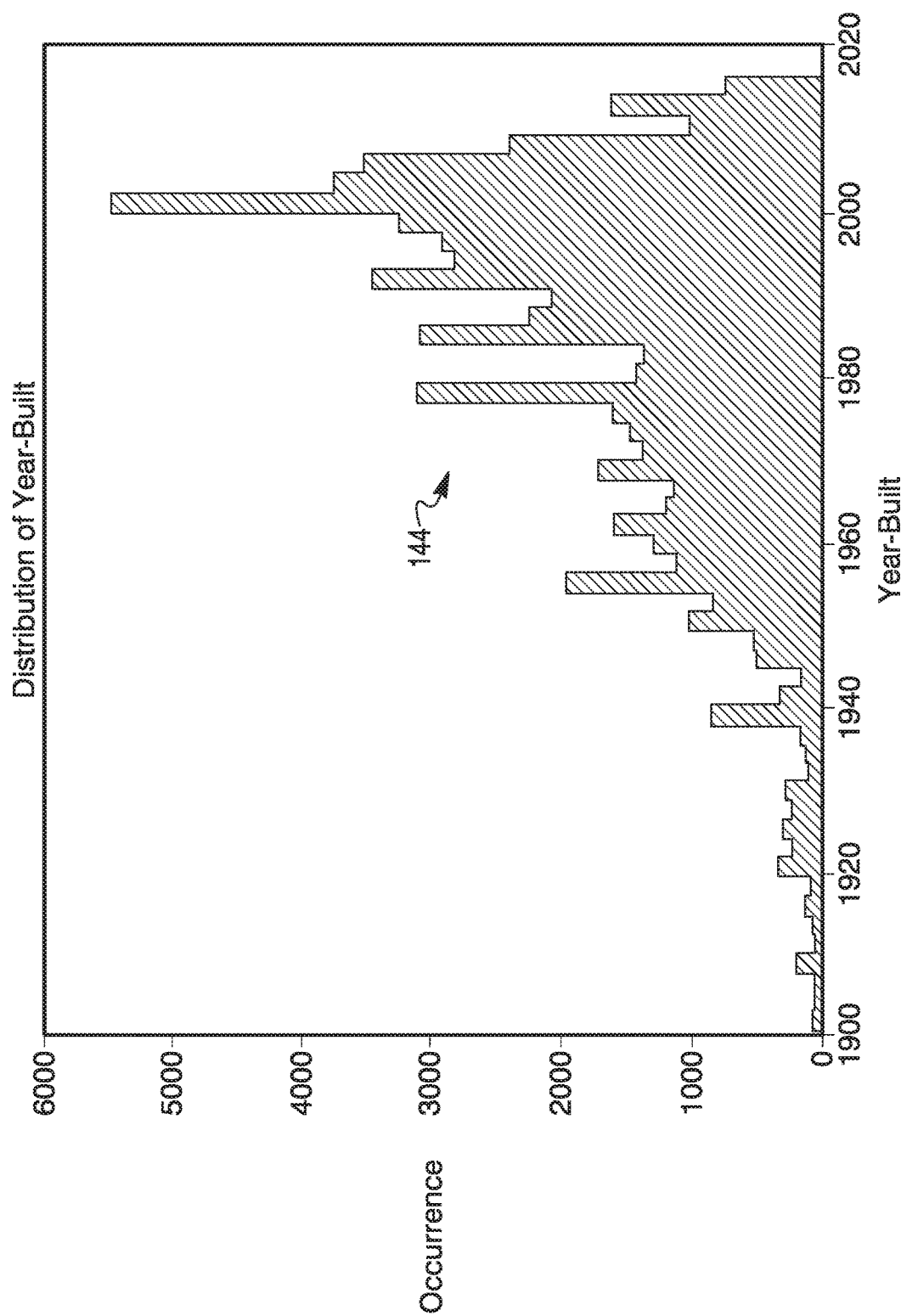
FIG. 21 is a diagram of a graph of a distribution of year-built in view of occurrences of residences.

FIG. 21 is a diagram of a graph 144 of a distribution of year-built. Graph 144 reveals a number of occurrences of homes versus a year built. Graph 144 may have a correspondence to plot 141 of FIG. 20.

Figure 22:
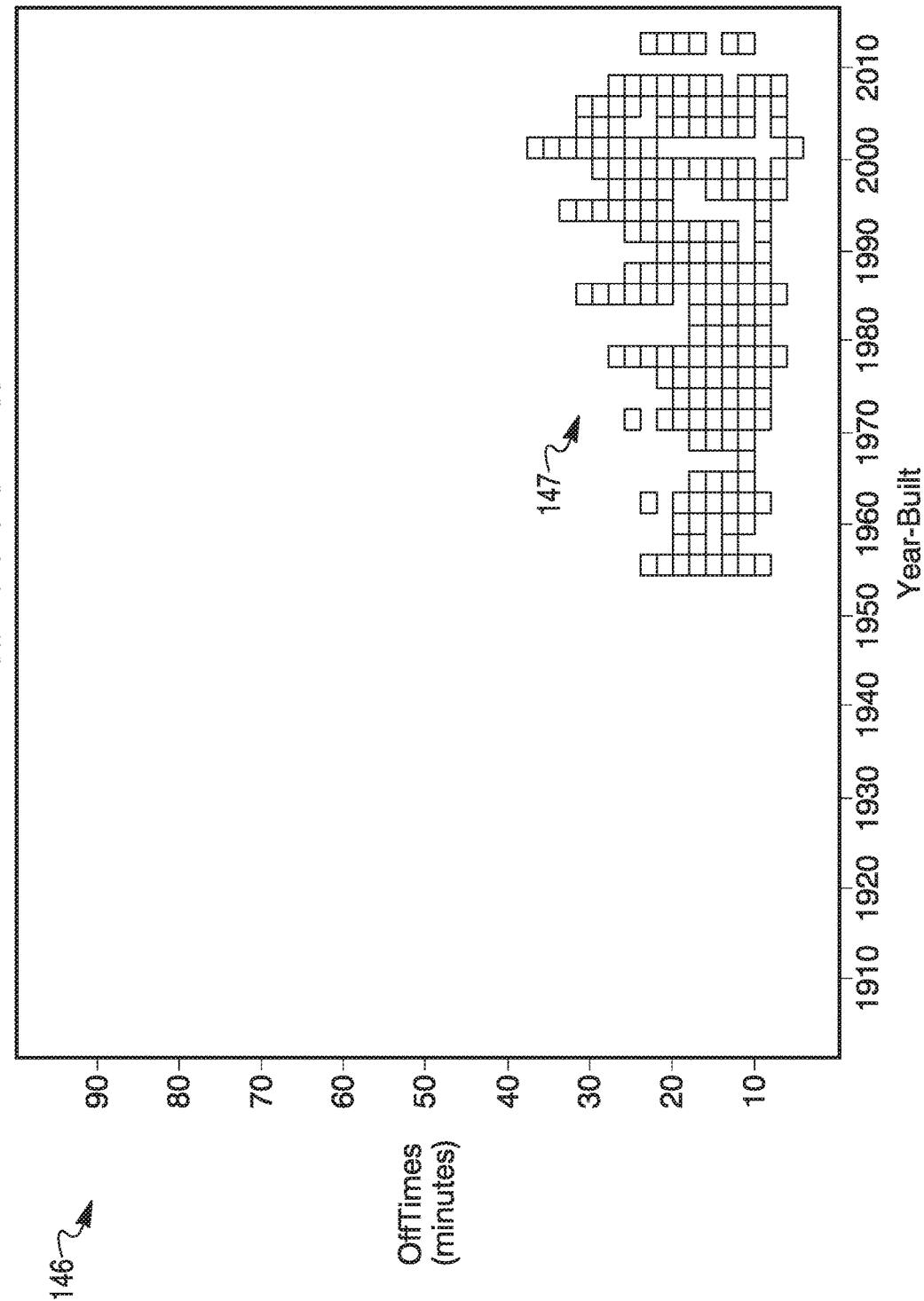
FIG. 22 is a diagram of a two-dimensional density plot of year-built versus off-times.

FIG. 22 is a diagram of a 2D density plot 146 of year-built versus off-times. The off-times are in terms of minutes. A density contrast 147 of plot appears between years 1955 and 2010 and off-times from about 5 to 30 minutes.

Figure 23:
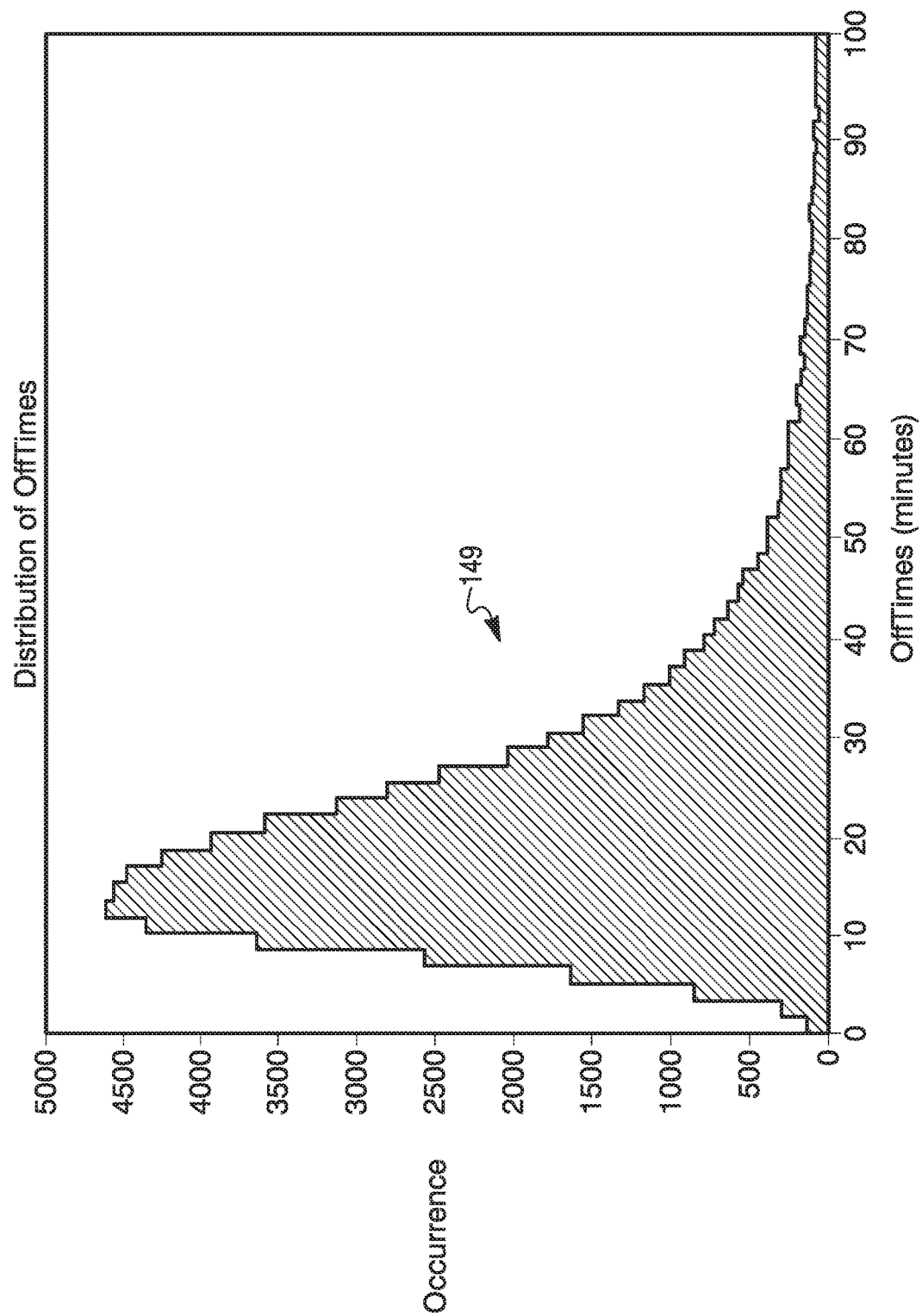
FIG. 23 is a diagram of a graph of a distribution of off-times in terms of a number of occurrences versus off-times.

FIG. 23 is a diagram of a graph 149 of a distribution having off-times in terms of a number of occurrences versus off-times in minutes. Graph 149 may have a correspondence to plot 146 in FIG. 22.

Figure 24:
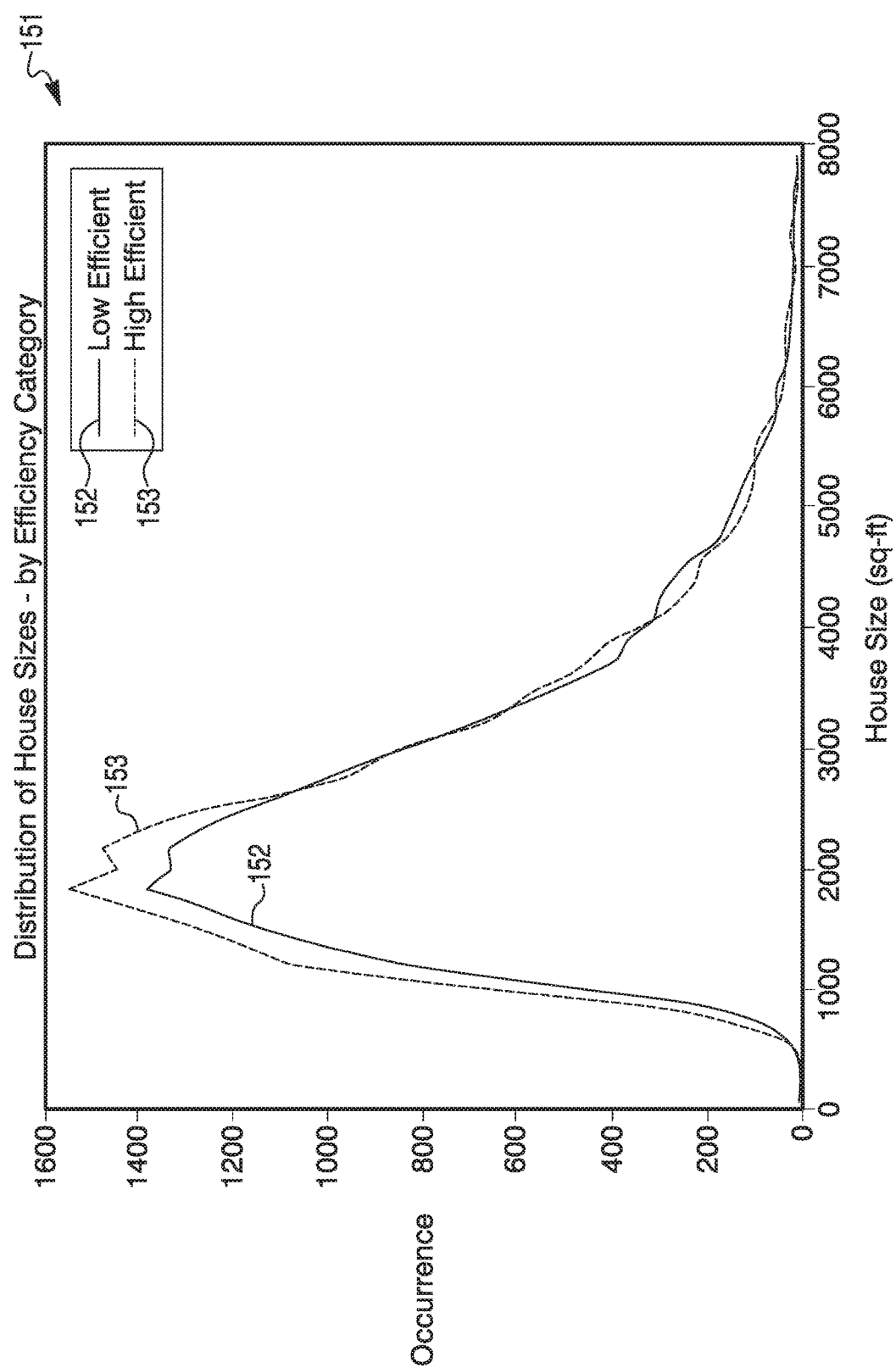
FIG. 24 is a diagram of a graph showing a distribution of house sizes by an efficiency category.

FIG. 24 is a diagram of a graph 151 showing a distribution of house sizes by efficiency category in terms of square feet versus a number of occurrences. A curve 152 represents low efficiency houses and a curve 153 represents high efficiency houses.

Figure 25:
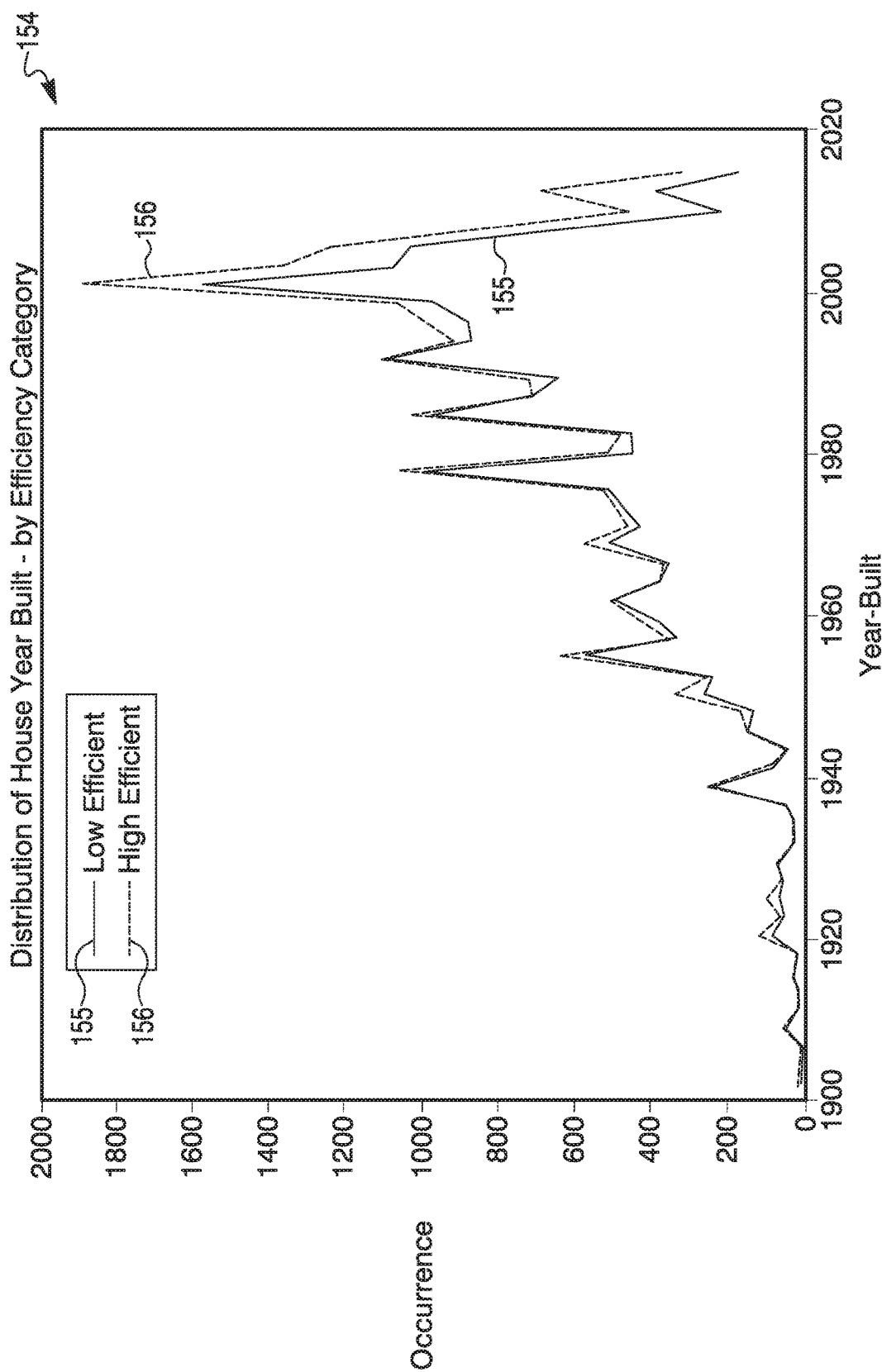
FIG. 25 is a diagram of a graph showing a distribution of houses according to year built by an efficiency category.

FIG. 25 is a diagram of a graph 154 showing a distribution of houses built by an efficiency category in terms of year built versus a number of occurrences. A curve 155 represents low efficiency houses and curve 156 represents high efficiency houses.

Figure 26:
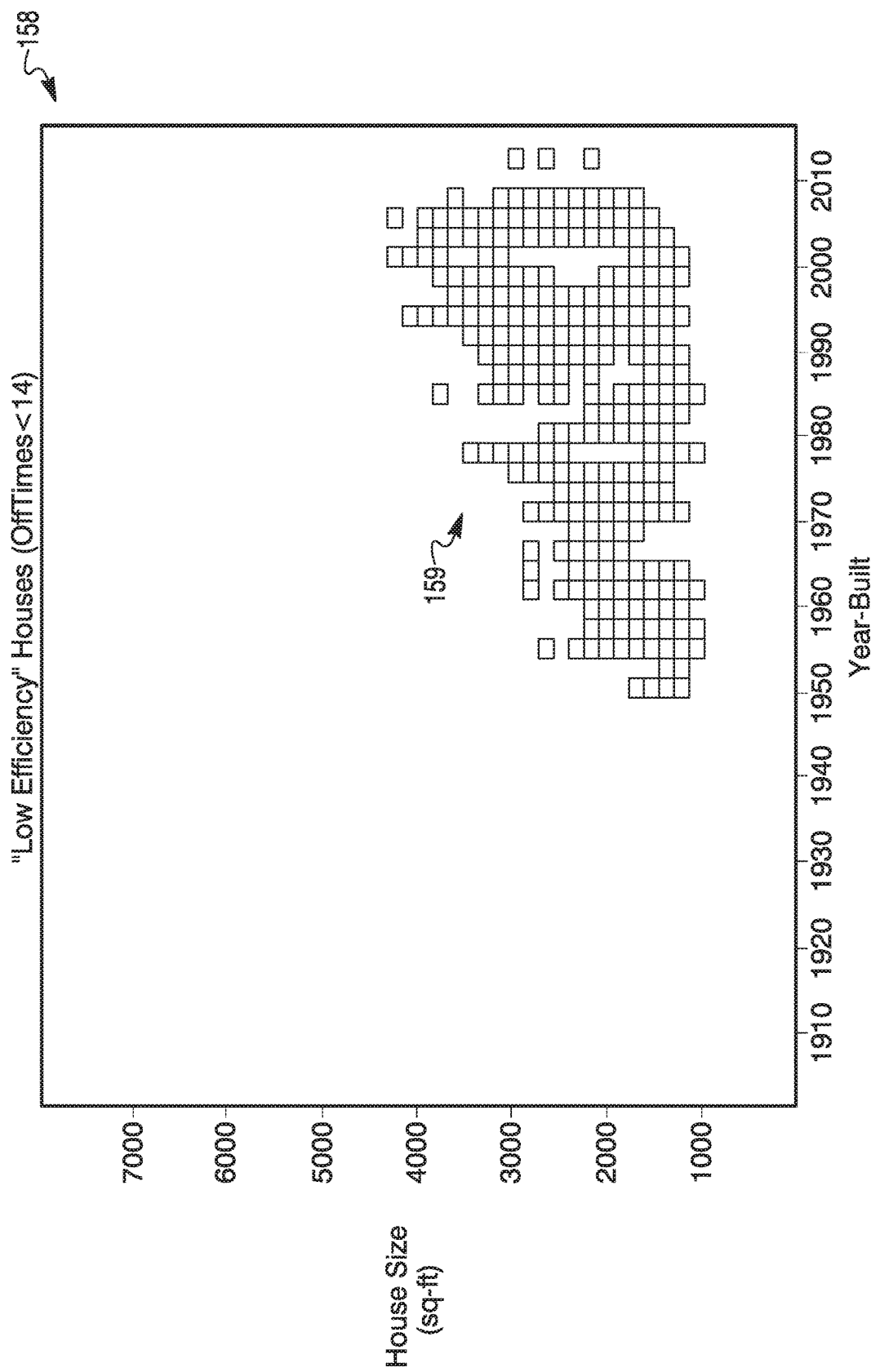
FIG. 26 is a diagram of a graph of low efficiency houses in terms of year built versus house size.

FIG. 26 is a diagram of a graph 158 of low efficiency houses (i.e., off-times <14) in terms of year built versus house size in terms of square feet. A contrast of density 159 appears between years 1950 and 2005 and between 1500 and 4000 square feet.

Figure 27:
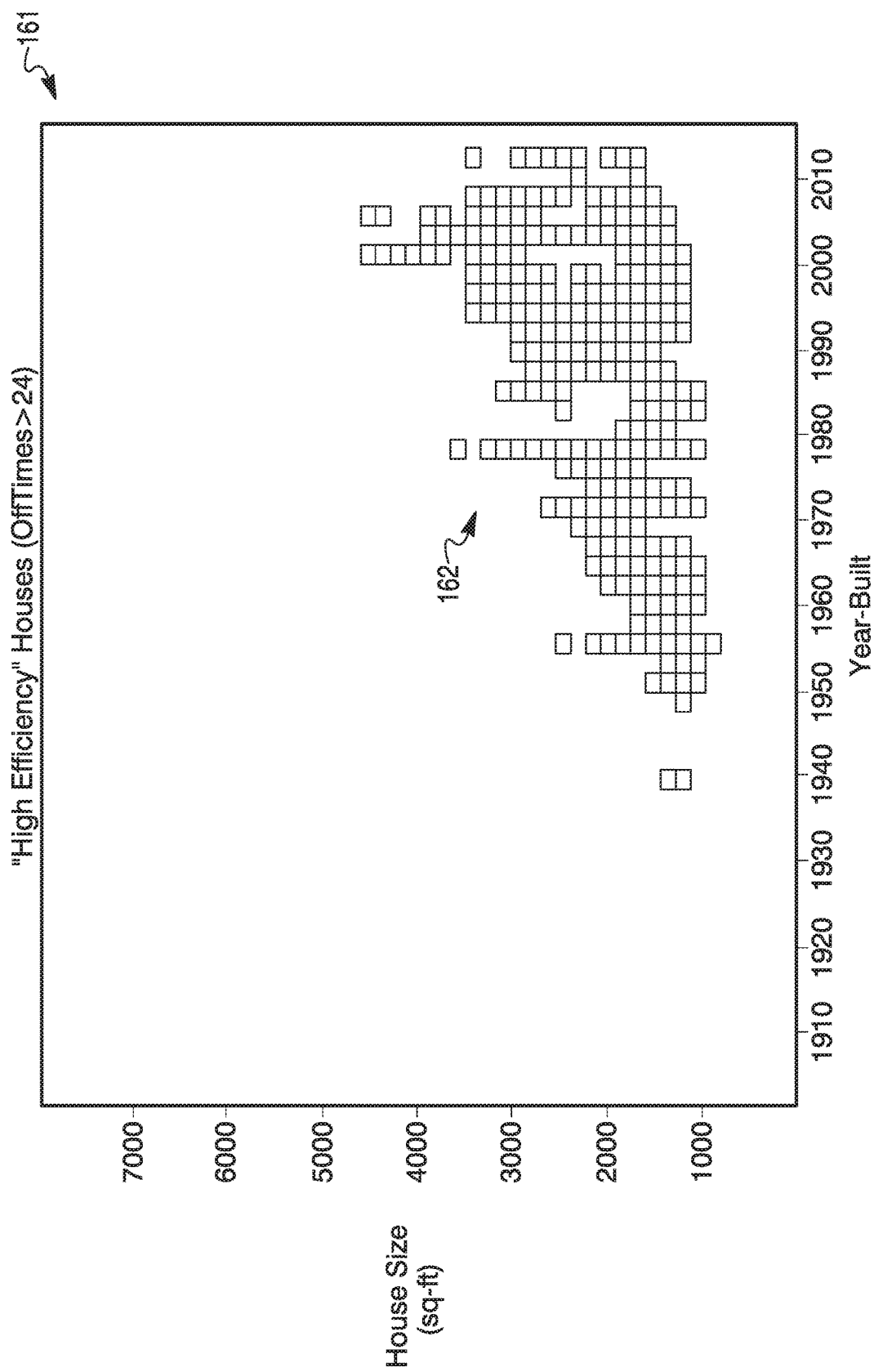
FIG. 27 is a diagram of a graph of high efficiency houses in terms of year built versus house size.

FIG. 27 is a diagram of a graph 161 of high efficiency houses (i.e., off-times >24) in terms of year built versus house size in terms of square feet. A contrast of density 162 appears between years 1959 and 2010 and between 1000 and 4000 square feet.

Figure 28:
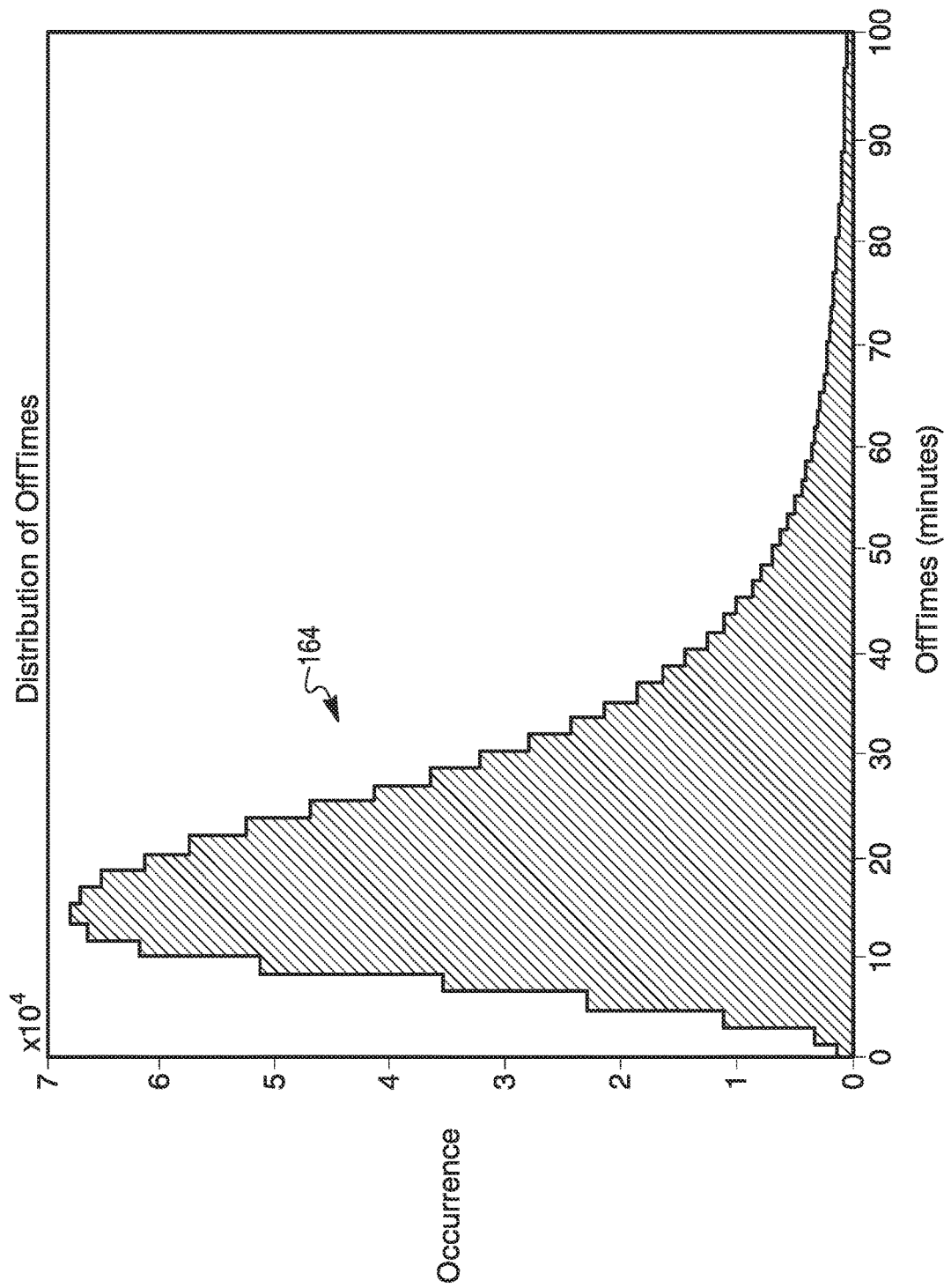
FIG. 28 is a diagram of a graph of a distribution of off-times in terms of minutes versus a number of occurrences.

Off-times may be computed for nine week periods to note score stability by evaluating scores over nine weeks. FIG. 28 is a diagram of a graph 164 of a distribution of off-times in terms of minutes versus a number of occurrences.

Figure 29:
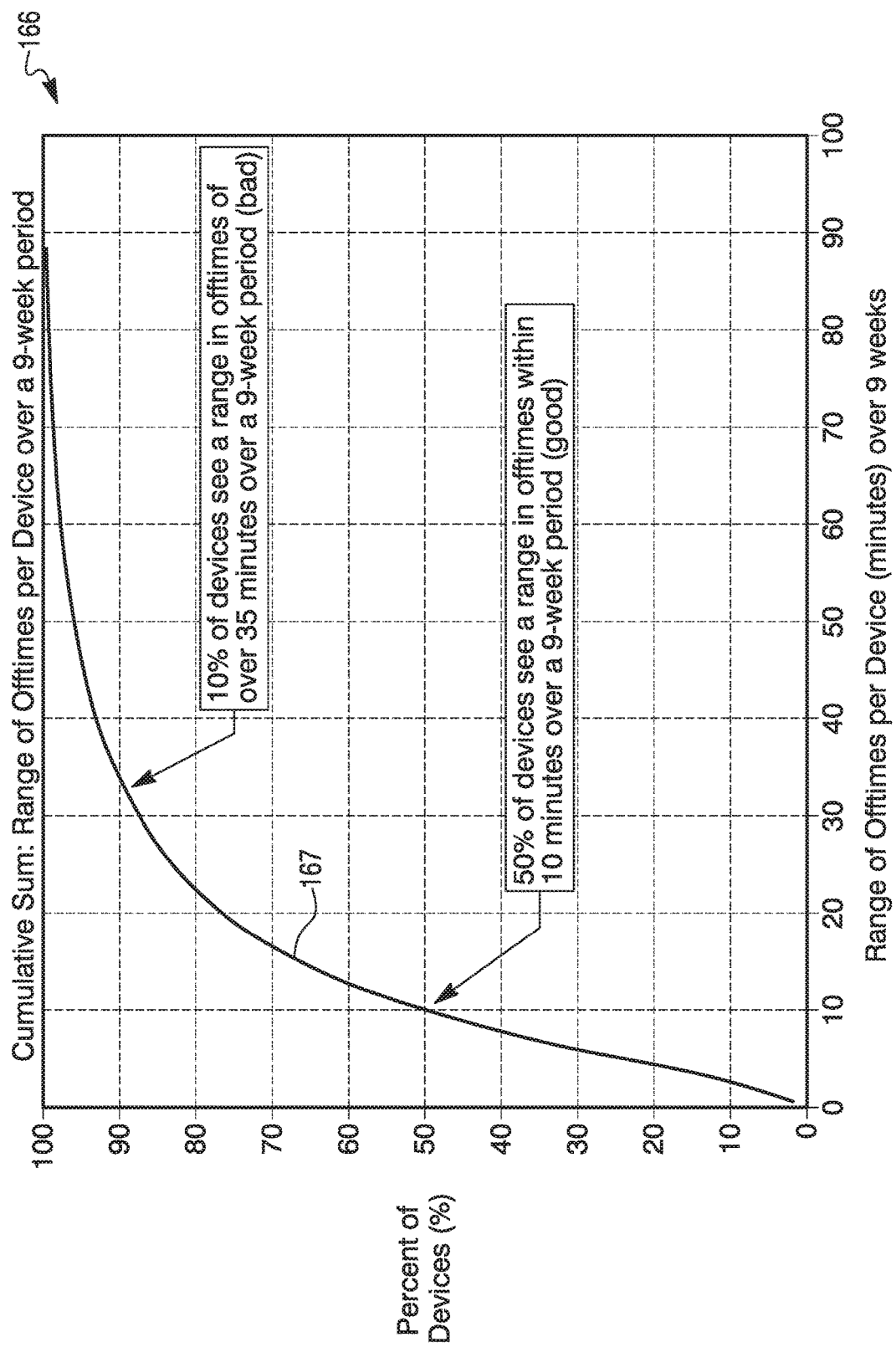
FIG. 29 is a diagram of a graph of a cumulative sum involving a range of off-times per device over a multi-week period.

FIG. 29 is a diagram of a graph 166 of a cumulative sum involving a range of off-times per device over a nine-week period from January 1 through March 3rd. Graph 166 is plotted in terms of a range of off-times per device (minutes) versus a percentage of devices as indicated by a curve 167. Ten percent of the devices may see a range in off-times of over 35 minutes over a nine-week period, which can appear bad. Fifty percent of the devices may see a range in off-times within 10 minutes over a nine-week period, which can appear good. Scores were developed from 113,335 devices.

Figure 30:
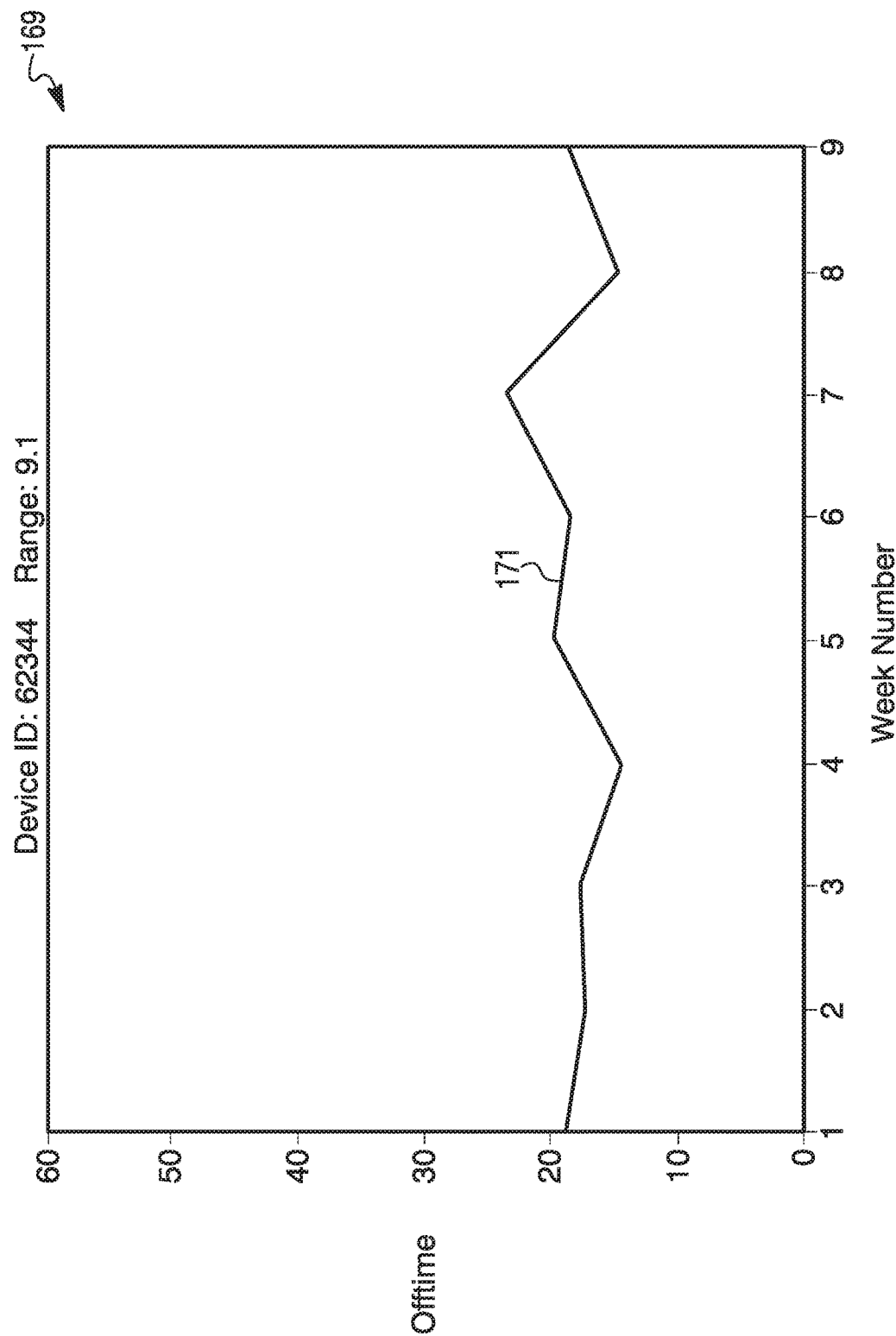
FIG. 30 is diagram of a graph having a curve of a week number versus off-time in terms of minutes for a sample house.
Figure 31:
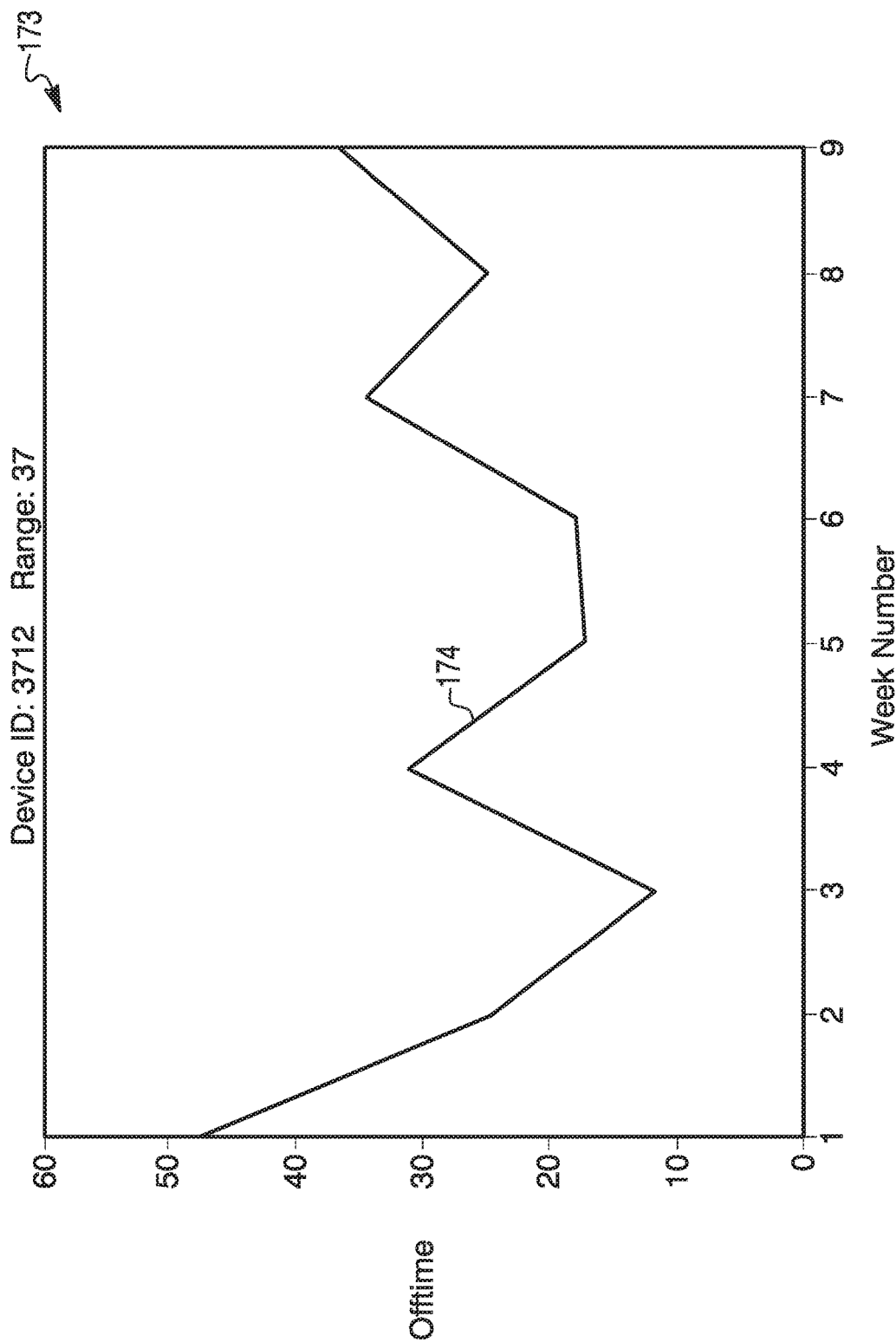
FIG. 31 is diagram of a graph having a curve of week number versus off-time in terms of minutes for another sample house.

An overall range of off-times within a nine-week period may be used as a stability metric. FIG. 30 is diagram of a graph 169 having a curve 171 of week number of the nine weeks versus off-time in terms of minutes for a sample house. This house may be regarded as having a stable score. FIG. 31 is diagram of a graph 173 having a curve 174 of week number of the nine weeks versus off-time in terms of minutes for another sample house. This house may be regarded as having an unstable score. The fluctuations of curves 171 and 174 may indicate the scores' stabilities, respectively.

Figure 32:
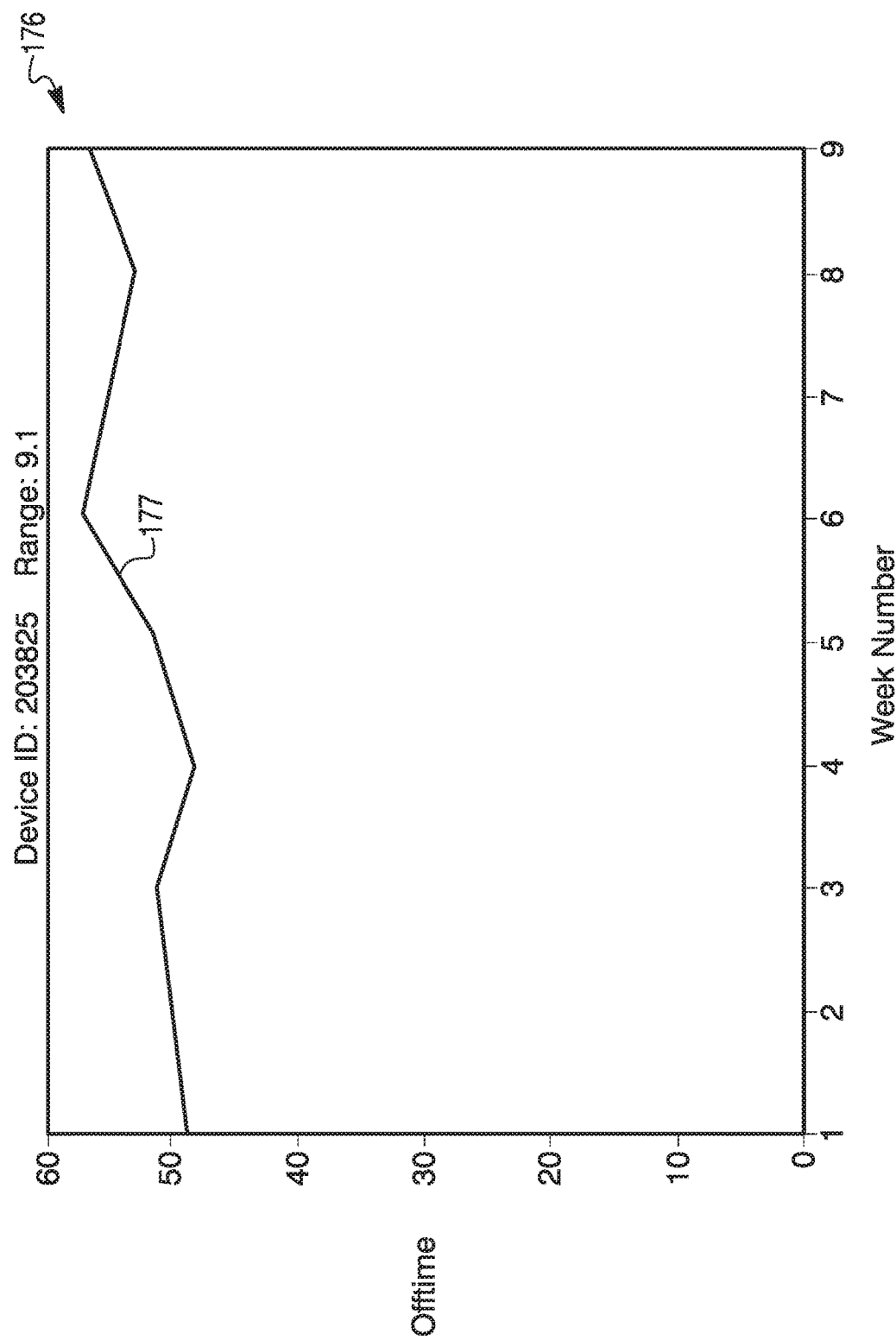
FIG. 32 is a diagram of a graph with a curve that appears to have low fluctuations and be relatively high in terms of off-times versus week numbers.

A stable and efficient house may be noted. FIG. 32 is a diagram of a graph 176 with a curve 177 that appears to have low fluctuations and be relatively high in terms of off-times versus the week numbers.

Figure 33:
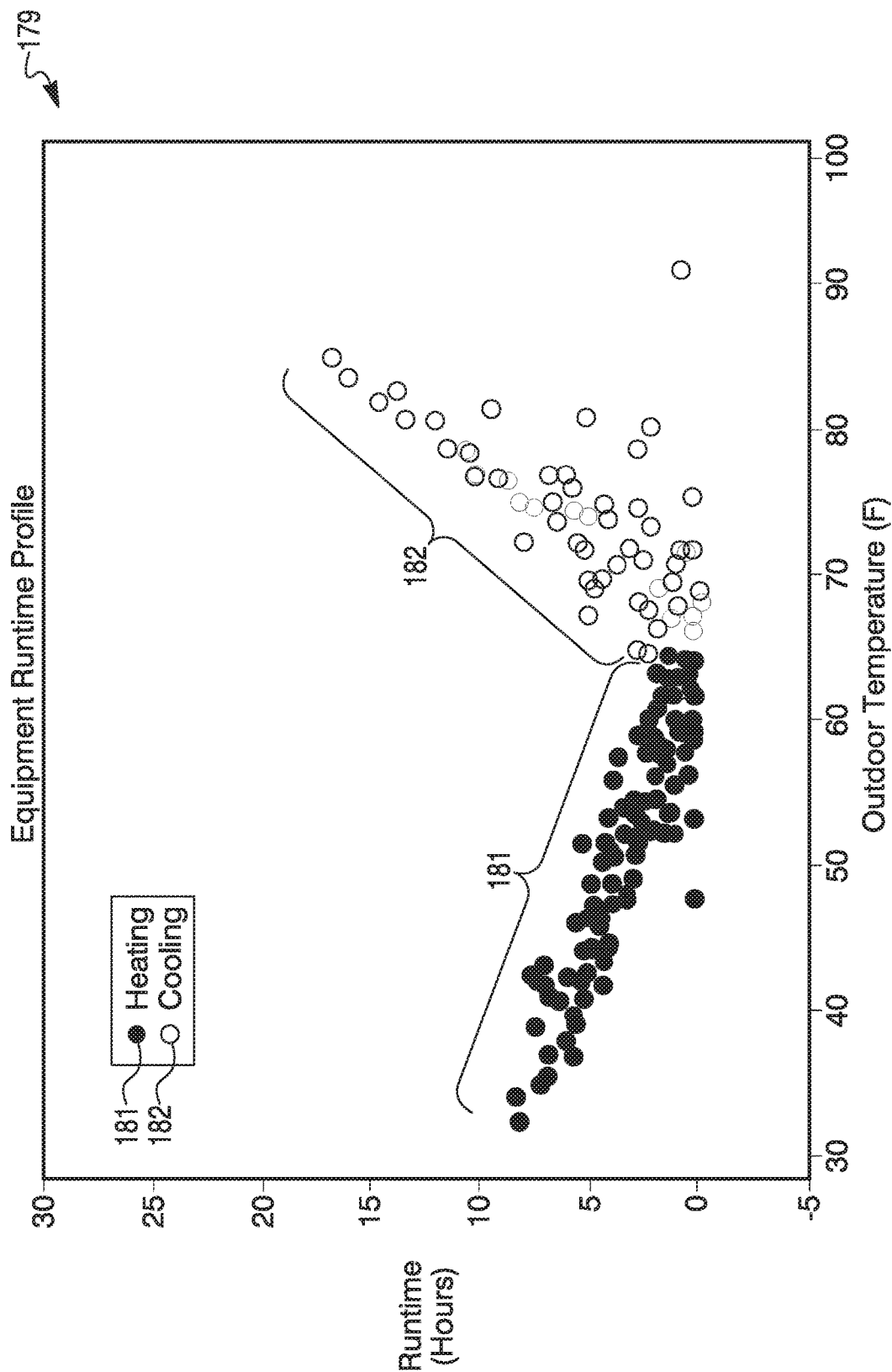
FIG. 33 is a diagram of a graph revealing an equipment runtime profile in terms of outdoor temperature versus runtime.

FIG. 33 is a diagram of a graph 179 revealing an equipment runtime profile in terms of outdoor temperature in degrees F. versus runtime hours. Plots 181 represent heating and plots 182 represent cooling. The data may be from a 1900 square foot house built in 1965 with a fireplace, in Madison, Miss.

Figure 34:
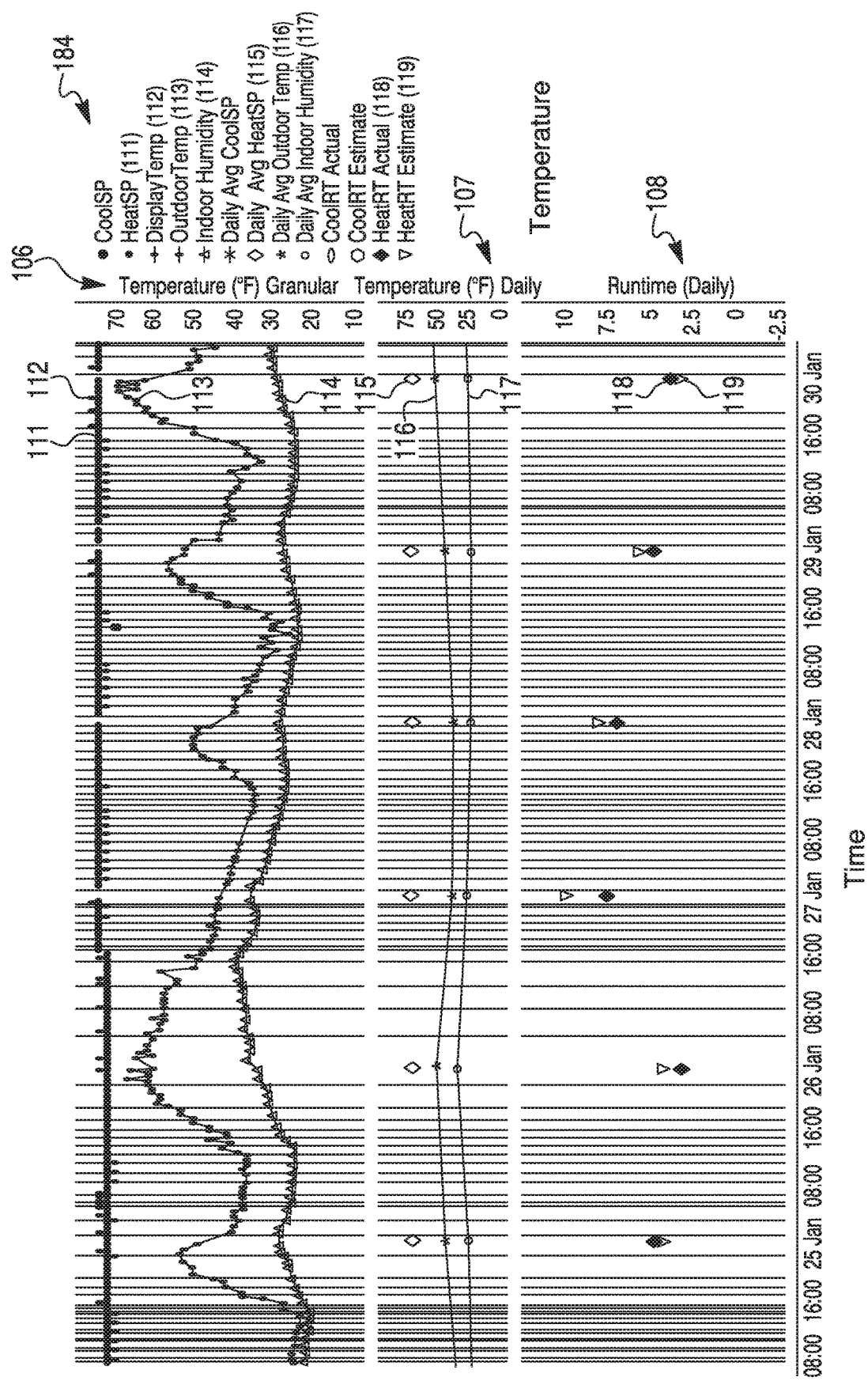
FIG. 34 is a diagram of a graph of time versus granular temperature, daily temperature and daily runtime temperature for a specific residence

FIG. 34 is a diagram of a graph like those in FIGS. 13 and 14. FIG. 34 is a diagram of a graph 184 of time versus granular temperature 106, daily temperature 107 and daily runtime temperature 108. This data may relate to the house noted for FIG. 33. Symbols 111, 112, 113, 114, 115, 116, 117, 118 and 119 may represent heat SP, display temp, outdoor temp, indoor humidity, daily average heat SP, daily avg outdoor temp, daily avg indoor humidity, heat RT actual and heat RT estimate, respectively.

Figure 35:
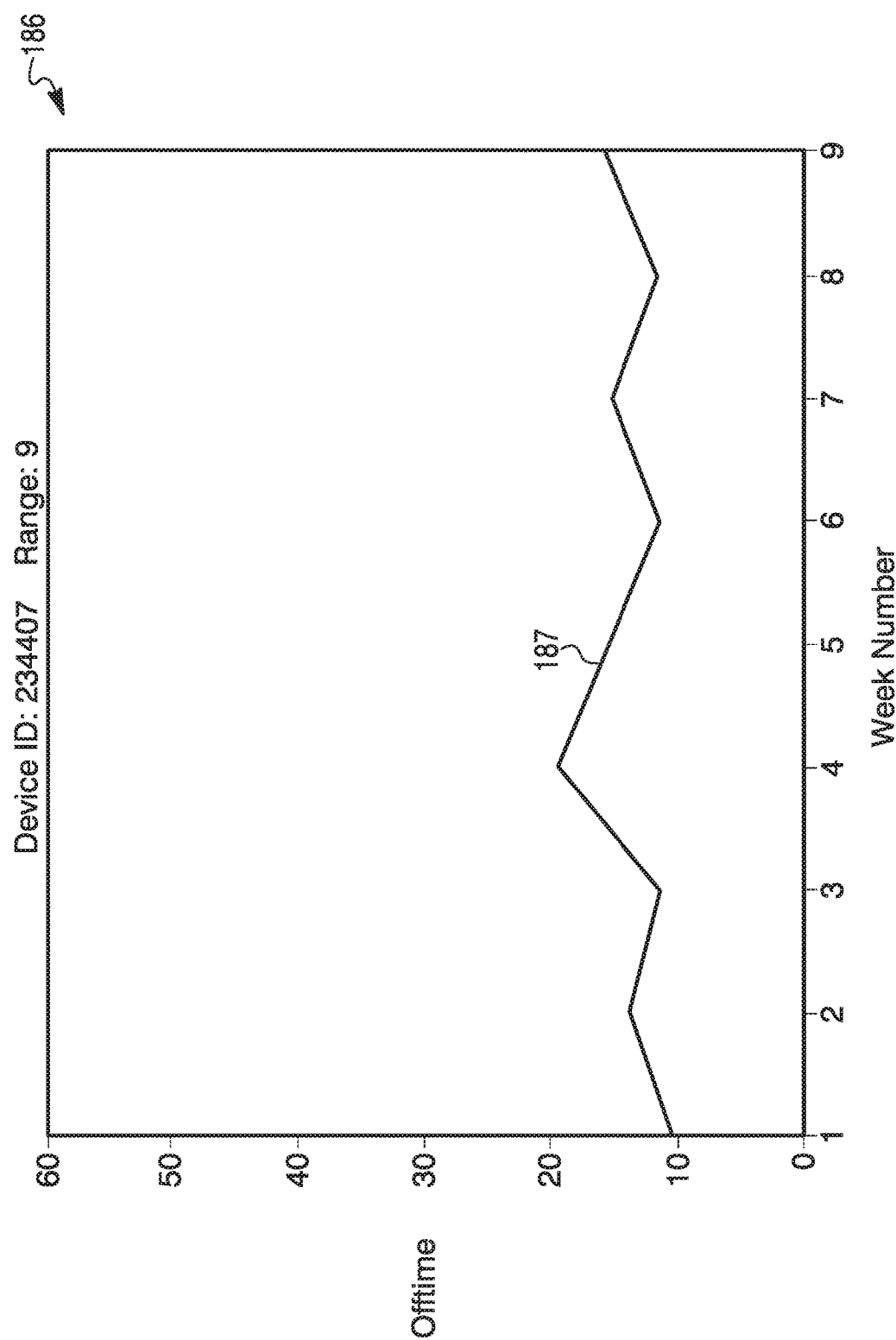
FIG. 35 is a diagram of a graph with a curve that appears to have low fluctuations and be relatively low in terms of off-times versus the week numbers.

A stable and inefficient house may be noted. FIG. 35 is a diagram of a graph 186 with a curve 187 that appears to have low fluctuations and be relatively low in terms of off-times versus the week numbers.

Figure 36:
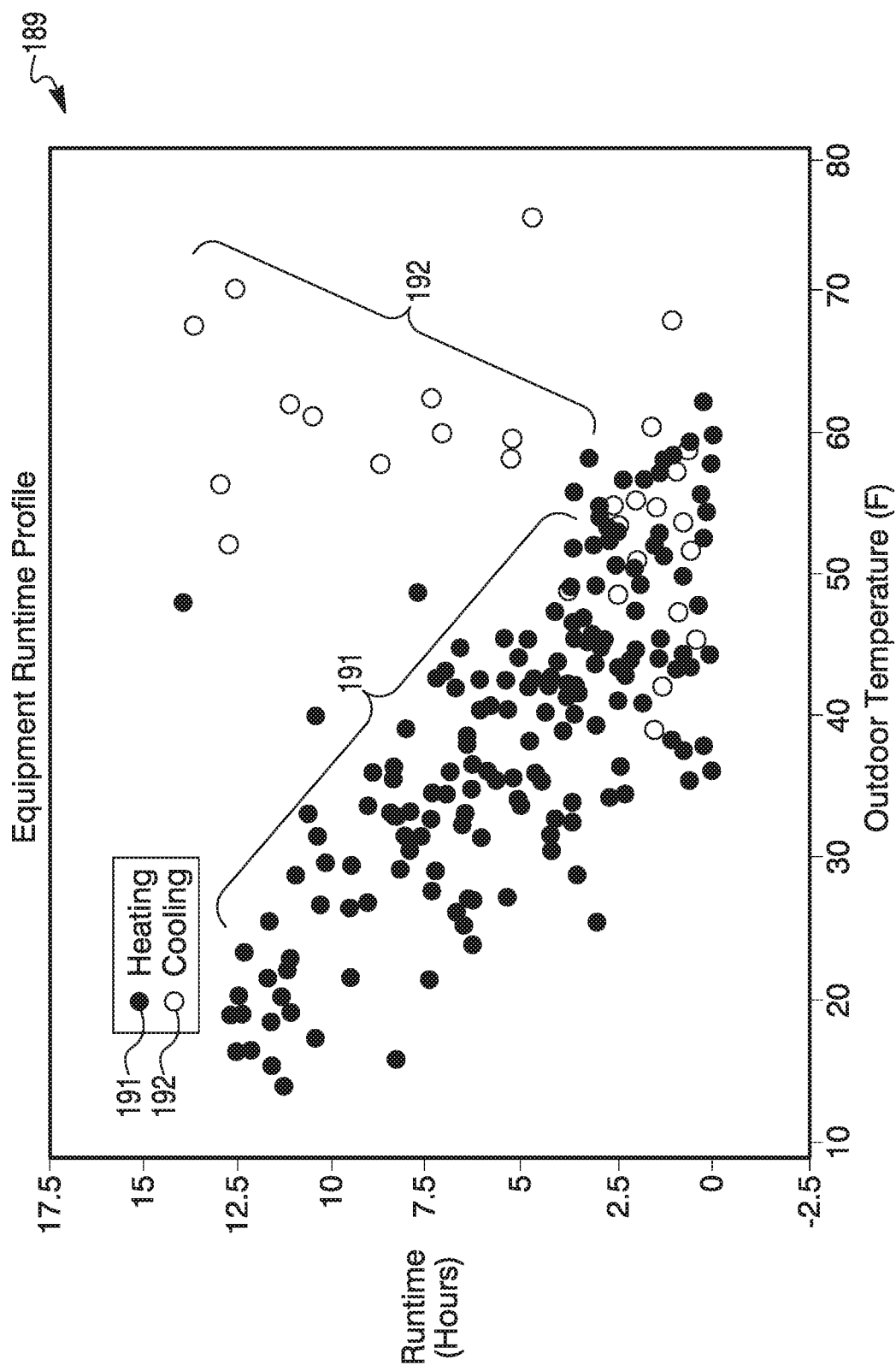
FIG. 36 is a diagram of a graph revealing an equipment runtime profile in terms of outdoor temperature versus runtime for another residence.

FIG. 36 is a diagram of a graph 189 revealing an equipment runtime profile in terms of outdoor temperature in degrees F. versus runtime hours. Plots 191 represent heating and plots 192 represent cooling. The data may be from a 3500 square foot house built in 2013 with a fireplace, in Colorado Springs, Colo.

Figure 37:
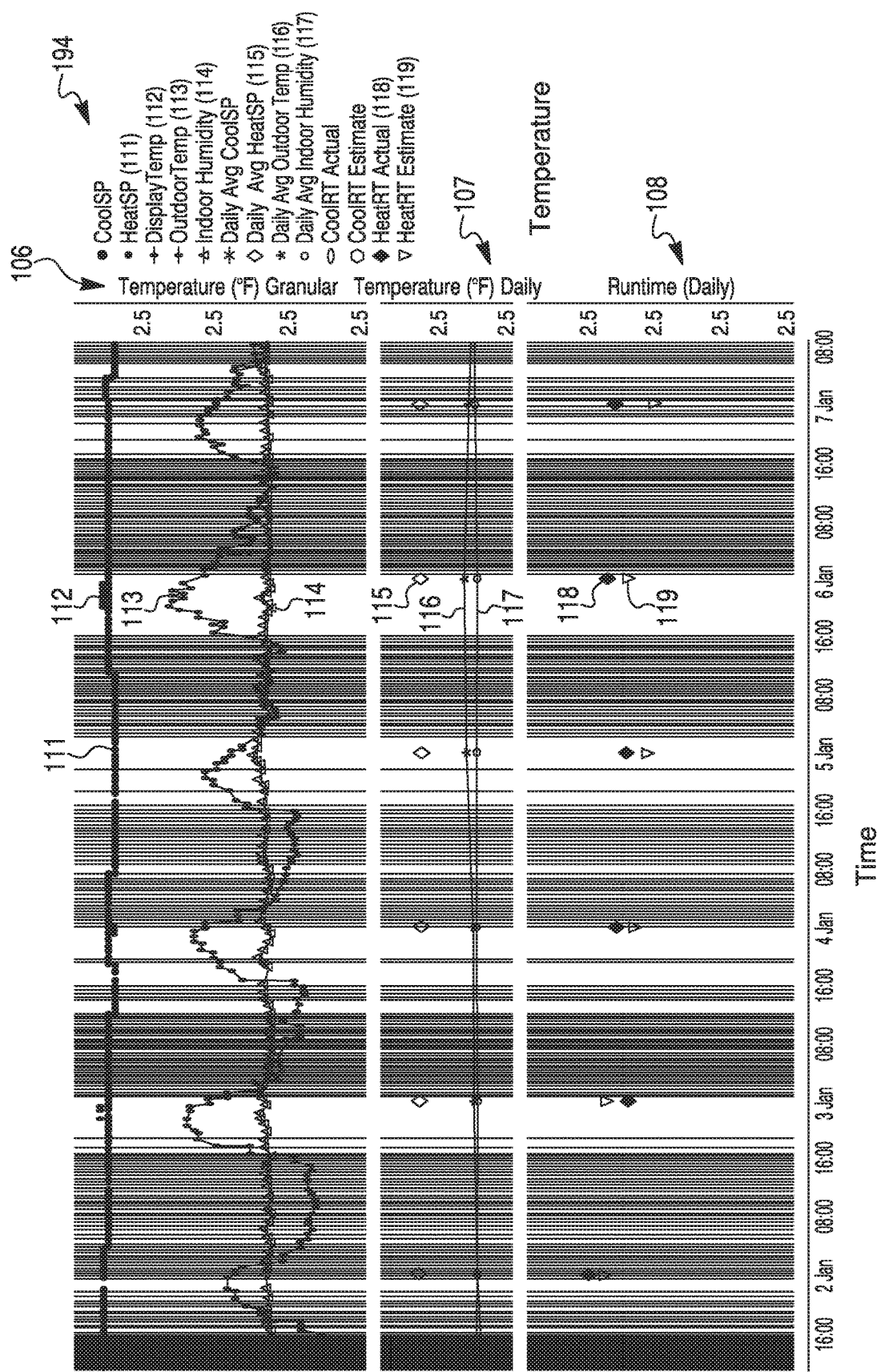
FIG. 37 is a diagram of a graph of time versus granular temperature, daily temperature and daily runtime temperature relative to the residence noted in FIG. 36.

FIG. 37 is a diagram of a graph like those in FIGS. 13 and 14. FIG. 37 is a diagram of a graph 194 of time versus granular temperature 106, daily temperature 107 and daily runtime temperature 108. This data may relate to the house noted in FIG. 36. Symbols 111, 112, 113, 114, 115, 116, 117, 118 and 119 may represent heat SP, display temp, outdoor temp, indoor humidity, daily average heat SP, daily avg outdoor temp, daily avg indoor humidity, heat RT actual and heat RT estimate, respectively.

Figure 38:
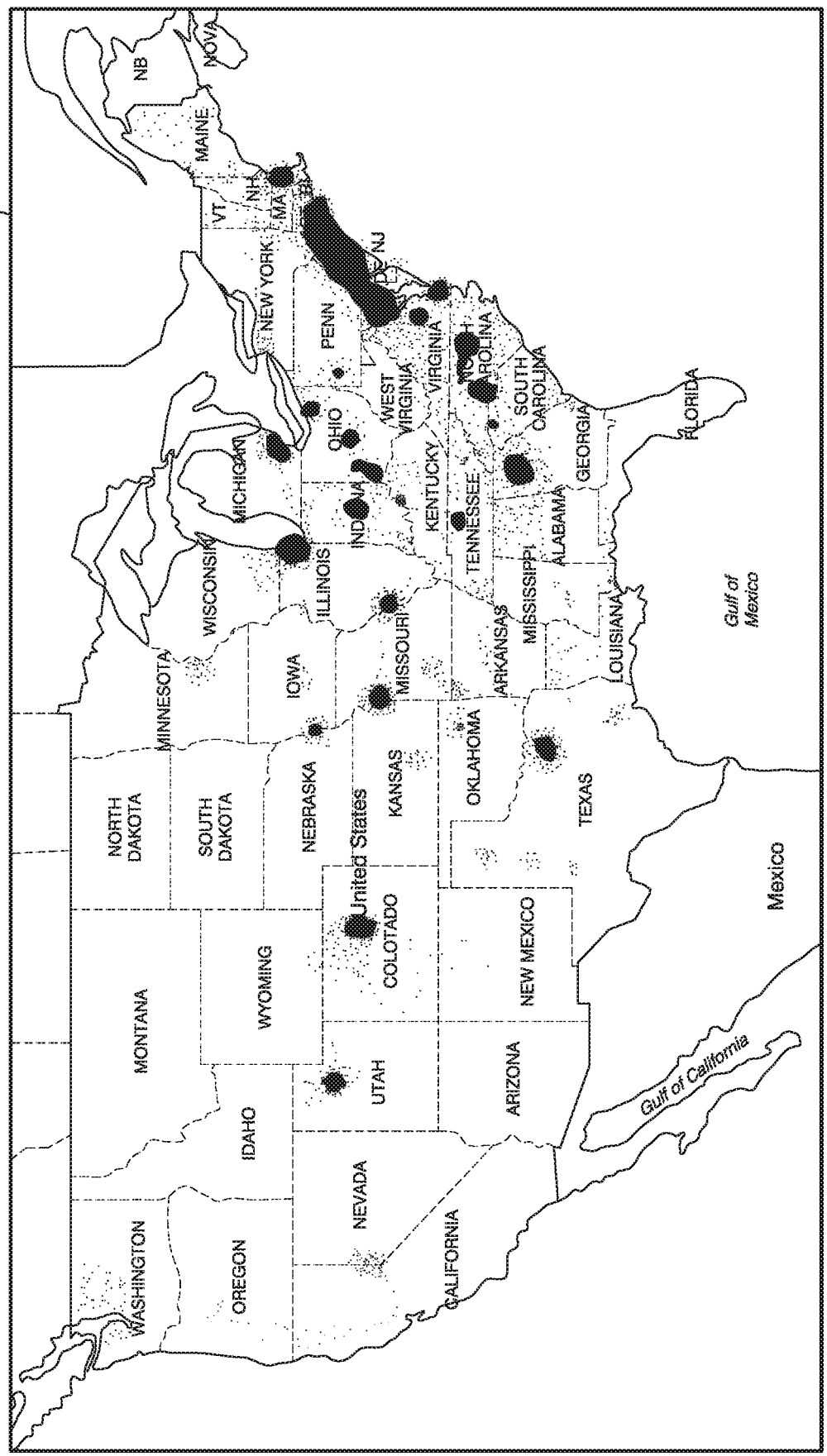
FIG. 38 is a diagram of a graphical map showing a geographic distribution of stable locations.

FIG. 38 is a diagram of a graphical map 196 showing a geographic distribution of stable locations. Houses at these locations have a small range of values in the off-times over the first nine weeks of a year. These houses are in the top quartile in that about 27,000 houses have a range of off-times under six minutes. The darker shading on the map indicate the concentrations of the stable locations.

Figure 39:
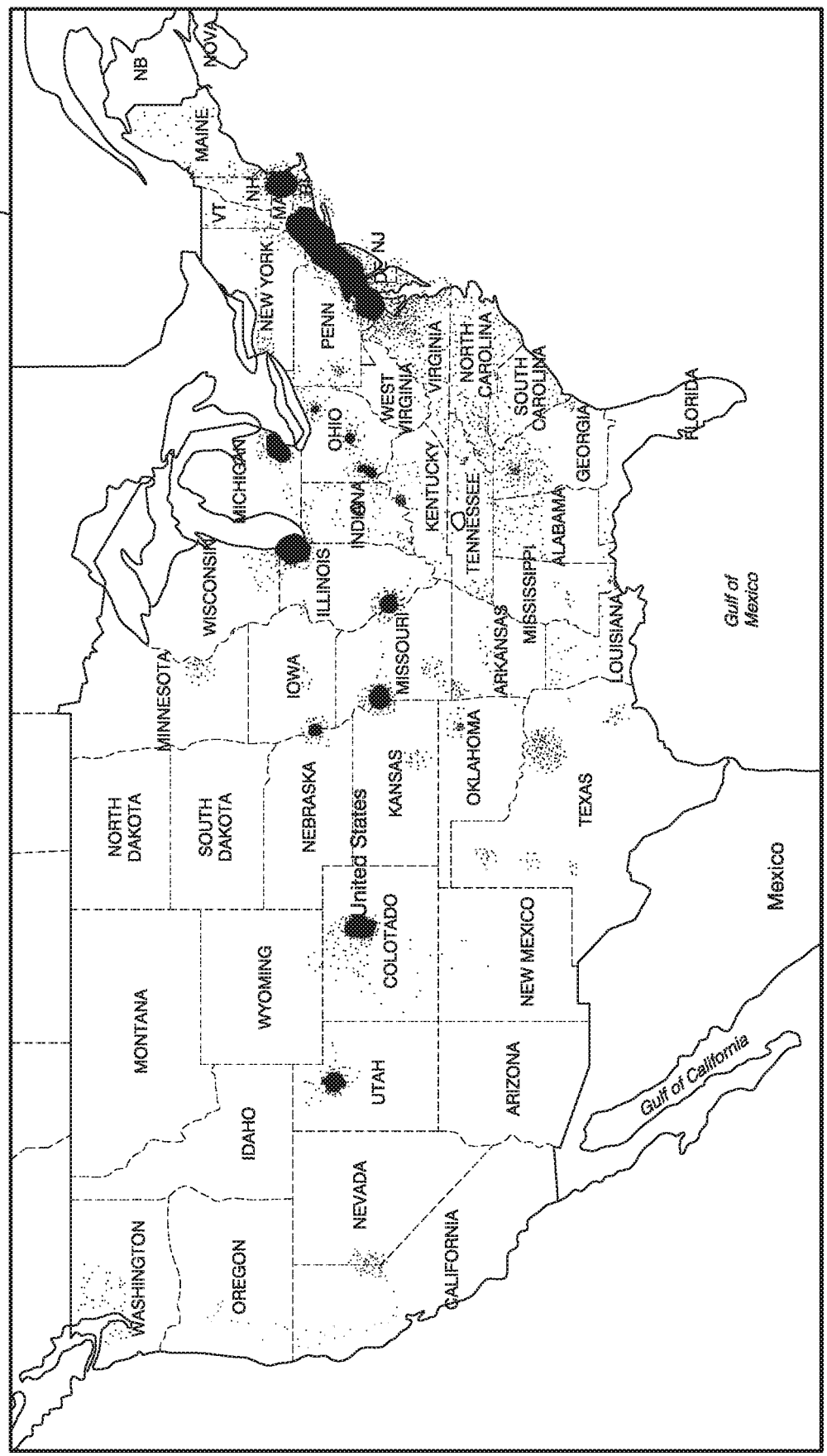
FIG. 39 is a diagram of a graphical map showing a geographic distribution of unstable locations.

FIG. 39 is a diagram of a graphical map 198 showing a geographic distribution of unstable locations. Houses at these locations have a large range of values in the off-times over the first nine weeks of a year. These houses are in the bottom quartile in that about 27,000 houses have a range of off-times over twenty minutes. The darker shading on the map indicate the concentrations of the unstable locations.

To recap, a residential energy efficiency rating system may incorporate a customer data storage, a historical device data storage, a weather data storage, a residential structure data storage, a residential energy efficiency rating storage, and a residential energy efficiency rating calculator connected to the customer data storage, the historical device data storage, the weather data storage, the residential structure data storage, and the residential energy efficiency rating storage.

Information for a residence may be loaded from the customer data storage. Device data may be retrieved for the residence from the historical device data storage for a predetermined duration of time. Other relevant data may be retrieved from the weather data storage and the residential structure data storage. A heating, ventilation and air conditioning (HVAC) cycle may be identified during a designated observation window. An HVAC cycle off-time cycle duration may be calculated for each relevant cycle.

The HVAC cycle off-time duration may be used as a proxy for rate of temperature change in the residence.

The HVAC off-time duration may be calculated when one or more predetermined conditions are met. Examples of the one or more predetermined conditions may incorporate an external temperature range, HVAC system activity, times when external influences are minimized, and so forth.

Multiple efficiencies may be calculated over a period of time. A representative efficiency may be selected as the overall efficiency for the period.

The system may further incorporate one or more sensors situated at one or more residential properties, an aggregation and sending device connected to the one or more sensors, and a central data receiver and processor connected to the aggregation and sending device, and the historical device data storage. The one or more sensors may provide collected data about the one or more residential properties. The collected data may be provided to the aggregation and sending device that sends the data to the central data receiver and processor.

The collected data to the aggregation and sending device may be processed as needed and saved in the historical data storage. An internet may be connected between the aggregation and sending device and the central data receiver and processor, such that the collected data provided to the aggregation and sending device can be sent over the internet to the central data receiver and processor.

Data from the historical data storage may be an input to the residential energy efficiency rating (REER) calculator. An output from the REER calculator may go to a REER data application program interface (API) which has an output connected to one or more client applications via the internet.

An estimated residential energy efficiency rating mechanism may incorporate an energy rating data storage, a model training processor connected to the energy rating data storage, a model parameters storage connected to the model training processor, an estimated REER (eREER) calculation processor connected to the model parameter storage, and one or more storages connected to the model training processor and the eREER calculation processor.

The one more storages may be selected from a group incorporating a residential structure data storage and a consumer demographic data storage.

The mechanism may further incorporate an estimated REER (eREER) data application program interface (API) connected to the eREER calculation processor.

The mechanism may further incorporate one or more client applications connected to the eREER data API.

The mechanism may further incorporate an eREER storage connected to the eREER calculation processor and to the eREER data API, and one or more client applications connected to the eREER calculation processor and to the eREER storage. A client application may request on-demand results from the eREER calculation processor, where the results are calculated on-the-fly, through the eREER data API, or a client application may make a request for results of the eREER calculation processor that have been calculated previously and saved in the eREER storage.

The one or more client applications may be connected to the eREER data API via an internet.

An approach for calculating a residential energy efficiency rating, may incorporate obtaining sensor data about residential properties, aggregating and sending the sensor data to a device data receiver and processor, processing the sensor data at the device data receiver and processor, storing the sensor data in a historical storage data device, storing the status of heating, ventilation and air conditioning (HVAC) systems in the historical storage device, storing weather data in the weather storage device, storing residential structure data in the structure data storage device, storing consumer demographic data in the demographic data storage device, and calculating a residential energy efficiency rating (REER) about the residential properties from data selected from one or more items in a group incorporating the historical data storage device, the weather data storage device, the structure data storage device, the demographic data storage device, and a customer data storage device.

The approach may further incorporate storing calculated REER information in a REER data storage device.

The approach may further incorporate monitoring and controlling access to the REER data by one or more client applications with an estimated REER (eREER) data application program interface (API). The REER data may be available via the internet to the one or more client applications.

Sensor data may be obtained from one or more items of a group incorporating outdoor temperature sensors, indoor temperature sensors, HVAC status data, set-point settings, connected thermostats, connected water leak detectors, connected water heater detectors, and connected home security system detectors.

The approach may further incorporate inferring status of HVAC systems or set-points of the residential properties from temperature data, and storing the status of HVAC systems or set-points in the historical storage device.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A residential energy efficiency rating system, the system comprising:
a customer data storage configured to store structure location information for each residence of a plurality of residences;
a historical device data storage configured to store heating, ventilation and air conditioning (HVAC) equipment run-time information for each residence of the plurality of residences;
a weather data storage configured to store outdoor weather data, wherein the outdoor weather data comprises one or more of an outdoor temperature, an outdoor wind speed, and an outdoor humidity;
a residential structure data storage configured to store residential structure information for each residence of the plurality of residences, wherein the residential structure information comprises one or more of an age and a size of a respective residence of the plurality of residences;
a residential energy efficiency rating storage configured to store a residential energy efficiency for each respective residence of the plurality of residences;
a processor configured to implement a residential energy efficiency rating calculator connected to the customer data storage, the historical device data storage, the weather data storage, the residential structure data storage, and the residential energy efficiency rating storage and configured to, for each respective residence of the plurality of residences:
identify a plurality of cycles based on the HVAC equipment run-time information and the outdoor weather data;
select, from the plurality of cycles, a representative cycle for HVAC equipment at the respective residence;
calculate an HVAC cycle off-time duration for the representative cycle; and
determine, based on the structure location information for the respective residence and the HVAC cycle off-time duration, a residential energy efficiency for the respective residence, wherein, to determine the residential energy efficiency for the respective residence, the processor is configured to compare the HVAC cycle off-time duration and a plurality of HVAC cycle off-time durations for a plurality of other residences of the plurality of residences that are arranged in a residential area of the respective residence and wherein the residential energy efficiency for each respective residence of the plurality of residences forms a virtual energy audit for the plurality of residences for identifying a set of residences of the plurality of residences that would benefit from an in-person energy audit; and
wherein the processor is further configured to output, to a client application executed by one or more processors, the residential energy efficiency for a residence of the plurality of residences.

2. The system of claim 1, wherein the processor is configured to:
load the structure location information for a residence from the customer data storage;
retrieve the HVAC equipment run-time information for the respective residence from the historical device data storage for a predetermined duration of time;
retrieve the outdoor weather data from the weather data storage; and
retrieve the residential energy efficiency from the residential structure data storage,
wherein, to identify the plurality of cycles, the processor is configured to identify the plurality of cycles during a designated observation window.

3. The system of claim 1, wherein the HVAC cycle off-time duration is used as a proxy for rate of temperature change in the respective residence.

4. The system of claim 3, wherein the processor is configured to:
calculate multiple efficiencies over a period of time; and
select a representative efficiency from the multiple efficiencies as the overall efficiency for the period.

5. The system of claim 1, wherein the processor is configured to calculate the HVAC off-time duration in response to determining one or more predetermined conditions are satisfied.

6. The system of claim 1, further comprising:
one or more sensors situated at one or more residential properties;
an aggregation and sending device connected to the one or more sensors; and
a central data receiver connected to the aggregation and sending device, and the historical device data storage; and
wherein:
the one or more sensors provide collected data about the one or more residential properties; and
the collected data are provided to the aggregation and sending device that sends the data to the central data receiver.

7. The system of claim 6, wherein:
the collected data to the aggregation and sending device are processed as needed and saved in the historical data storage; and
an internet is connected between the aggregation and sending device and the central data receiver, such that the collected data provided to the aggregation and sending device are sent over the internet to the central data receiver.

8. The system of claim 7, wherein:
data from the historical data storage are an input to the residential energy efficiency rating (REER) calculator; and
an output from the REER calculator goes to a REER data application program interface (API) which has an output connected to one or more client applications via the internet.

9. The system of claim 1, wherein, to determine the residential energy efficiency for the respective residence, the processor is configured to correlate the HVAC cycle off-time duration and one or more of a house size of the respective residence or an age of the respective residence and to correlate the HVAC cycle off-time duration and a temperature difference between inside the respective residence and outside the respective residence.

10. The system of claim 1, wherein, to determine the residential energy efficiency for the respective residence, the processor is configured to calculate a structure surface to volume ratio of the respective residence and a number of windows per surface area of the respective residence.

11. A method for calculating a residential energy efficiency rating, the method comprising: obtaining, by a processor, sensor data about a plurality of residential properties; aggregating, by the processor, and sending, by the processor, the sensor data to a device data receiver; processing, by the processor, the sensor data at the device data receiver and processor; storing, by the processor, the sensor data in a historical storage data device; storing, by the processor, a status of heating, ventilation and air conditioning (HVAC) systems in the historical storage device; storing, by the processor, weather data in the weather storage device; storing, by the processor, residential structure data in the structure data storage device; storing, by the processor, consumer demographic data in the demographic data storage device; calculating, by the processor, a residential energy efficiency rating (REER) about the plurality of residential properties from data selected from one or more items in a group comprising the historical data storage device, the weather data storage device, the structure data storage device, the demographic data storage device, and a customer data storage device, wherein calculating the REER comprises, for each respective residential property of the plurality of residential properties: identifying, by the processor, a plurality of cycles based on the data selected from one or more items in the group comprising the historical data storage device, the weather data storage device, the structure data storage device, the demographic data storage device, and the customer data storage device; selecting, by the processor and from the plurality of cycles, a representative cycle for HVAC equipment at the respective residential property; calculating, by the processor, an HVAC cycle off-time duration for the representative cycle; and determining, by the processor, a residential energy efficiency for the respective residential property based on the HVAC cycle off-time duration and based on the data selected from one or more items in the group comprising the historical data storage device, the weather data storage device, the structure data storage device, the demographic data storage device, and the customer data storage device, wherein the residential energy efficiency for the plurality of residential properties forms a virtual energy audit for the plurality of residential properties for identifying a set of residential properties of the plurality of residential properties that would benefit from an in-person energy audit, wherein determining the residual energy efficiency for the respective residential property comprises comparing the HVAC cycle off-time duration and a set of HVAC cycle off-time durations for the plurality of residential properties of the residential properties that are arranged in a residential area of the respective residential property; and outputting, by the processor, to a client application executed by one or more processors, the residential energy efficiency for a residential property of the plurality of residential properties.

12. The method of claim 11, further comprising storing, by the processor, calculated REER information in a REER data storage device.

13. The method of claim 12, further comprising:
monitoring, by the processor, and controlling, by the processor, access to the REER data by one or more client applications with an estimated REER (eREER) data application program interface (API); and
wherein the REER data are available via the internet to the one or more client applications.

14. The method of claim 11, wherein sensor data are obtained from one or more items of a group comprising outdoor temperature sensors, indoor temperature sensors, HVAC status data, set-point settings, connected thermostats, connected water leak detectors, connected water heater detectors, and connected home security system detectors.

15. The method of claim 11, further comprises: inferring, by the processor, status of HVAC systems or set-points of the plurality of residential properties from temperature data; and storing, by the processor, the status of HVAC systems or set-points in the historical storage device.

* * * * *